United States Patent
Naoi

(10) Patent No.: US 10,676,040 B2
(45) Date of Patent: Jun. 9, 2020

(54) COVER FOR ONBOARD ELECTRONIC DEVICE

(71) Applicant: NIFCO INC., Yokosuka-shi, Kanagawa (JP)

(72) Inventor: Hajime Naoi, Yokosuka (JP)

(73) Assignee: NIFCO INC., Yokosuka-Shi, Kanagawa (JP)

(*) Notice: Subject to any disclaimer, the term of this patent is extended or adjusted under 35 U.S.C. 154(b) by 75 days.

(21) Appl. No.: 15/575,642

(22) PCT Filed: May 16, 2016

(86) PCT No.: PCT/JP2016/064480
§ 371 (c)(1),
(2) Date: Nov. 20, 2017

(87) PCT Pub. No.: WO2016/190153
PCT Pub. Date: Dec. 1, 2016

(65) Prior Publication Data
US 2018/0154842 A1 Jun. 7, 2018

(30) Foreign Application Priority Data
May 22, 2015 (JP) ................. 2015-104239

(51) Int. Cl.
*B60R 11/04* (2006.01)
*B60R 11/00* (2006.01)

(52) U.S. Cl.
CPC ....... *B60R 11/04* (2013.01); *B60R 2011/0026* (2013.01); *B60R 2011/0059* (2013.01); *B60R 2011/0075* (2013.01); *B60Y 2410/113* (2013.01)

(58) Field of Classification Search
CPC ............. B60R 11/04; B60R 2011/0026; B60R 2011/0059; B60R 2011/0075; B60Y 2410/113
See application file for complete search history.

(56) References Cited

U.S. PATENT DOCUMENTS 9,638,232 B2   5/2017  Takita et al.
9,862,332 B2*  1/2018  Okuda ................. B60R 11/04
(Continued)

FOREIGN PATENT DOCUMENTS

CN   101640340 A   2/2010
CN   104276074 A   1/2015
(Continued)

OTHER PUBLICATIONS

PCT/ISA/210, "International Search Report for International Application No. PCT/JP2016/064480", dated Aug. 2, 2016.
(Continued)

*Primary Examiner* — Anita M King
(74) *Attorney, Agent, or Firm* — Manabu Kanesaka

(57) ABSTRACT

An onboard electronic device cover configured to be engageably secured to a base member, which is to be fixed to a window glass of a vehicle, to cover an electronic device which is to be held on an installation part, includes: a mutual engaging mechanism capable of mutually engaging the onboard electronic device cover with the base member. The mutual engaging mechanism includes: an engaging part provided to one of the base member and the cover; an engaged part provided to the other of the base member and the cover and capable of engaging with the engaging part; and an urging member configured to urge the engaging part toward the engaged part. When the cover is pushed toward the window glass, the engaging part engages with the engaged part with being urged in a direction following a surface of the window glass by the urging member.

8 Claims, 20 Drawing Sheets

(56) References Cited

U.S. PATENT DOCUMENTS

| | | | | |
|---|---|---|---|---|
| 10,288,986 B2* | 5/2019 | Blake, III | ............... | G03B 17/55 |
| 2015/0042874 A1* | 2/2015 | Takeda | .................... | B60R 11/04 |
| | | | | 348/374 |
| 2015/0109447 A1 | 4/2015 | Okuda | | |
| 2019/0308563 A1* | 10/2019 | Fujiwara | ................. | B60R 11/04 |
| 2020/0047683 A1* | 2/2020 | Kasai | ..................... | H04N 5/225 |

FOREIGN PATENT DOCUMENTS

| | | |
|---|---|---|
| JP | H04-088507 U | 7/1992 |
| JP | H04-122250 U | 11/1992 |
| JP | 2005-112052 A | 4/2005 |
| JP | 2008-240887 A | 10/2006 |
| JP | 2012-144115 A | 8/2012 |
| JP | 2013-144475 A | 7/2013 |
| JP | 2013-184662 A | 9/2013 |
| JP | 2013-193558 A | 9/2013 |

OTHER PUBLICATIONS

PCT/ISA/237, "Written Opinion of the International Searching Authority for International Application No. PCT/JP2016/064480", dated Aug. 2, 2016
China Patent Office, "Office Action for Chinese Patent Publication No. 201680029549.0," dated Sep. 29, 2019.

* cited by examiner (WHEN THE COVER IS ROTATED OR PUSHED TOWARD THE WINDOW GLASS, THE ENGAGED PART ENTERS THE RECEIVING SPACE OF THE ENGAGING PART IN ASSOCIATION WITH DISPLACEMENT OF THE ELASTIC PIECE)

(THE URGING FORCE CAUSING SLIDING TO ENGAGEMENT POSITION AND MAINTAINING ENGAGED STATE IN URGED STATE)

(THE COVER IS SLIDE REARWARD FOR DISENGAGEMENT)

(THE COVER IS DEMOUNTED BY ROTATING OR PULLING THE SAME INTO THE INTERIOR WITH THE ENGAGEMENT BEING RELEASED)

(WHEN THE COVER IS ROTATED OR PUSHED TOWARD THE WINDOW GLASS, THE ENGAGED PART ENTERS THE RECEIVING SPACE OF THE ENGAGING PART IN ASSOCIATION WITH DISPLACEMENT OF THE ELASTIC PIECE)

(THE URGING FORCE CAUSING SLIDING TO ENGAGEMENT POSITION AND MAINTAINING ENGAGED STATE IN URGED STATE)

(THE COVER IS SLIDE REARWARD FOR DISENGAGEMENT)

(THE COVER IS DEMOUNTED BY ROTATING OR PULLING THE SAME
INTO THE INTERIOR WITH THE ENGAGEMENT BEING RELEASED)

(WHEN THE COVER IS ROTATED OR PUSHED TOWARD THE WINDOW GLASS, THE ENGAGED PART ENTERS THE RECEIVING SPACE OF THE ENGAGING PART IN ASSOCIATION WITH DISPLACEMENT OF THE ELASTIC PIECE)

(THE URGING FORCE CAUSING SLIDING TO ENGAGEMENT POSITION AND MAINTAINING ENGAGED STATE IN URGED STATE)

(THE COVER IS SLIDE REARWARD FOR DISENGAGEMENT)

(THE COVER IS DEMOUNTED BY ROTATING OR PULLING THE SAME INTO THE INTERIOR WITH THE ENGAGEMENT BEING RELEASED)

COVER FOR ONBOARD ELECTRONIC DEVICE

TECHNICAL FIELD

The present invention relates to a cover for onboard electronic device to be mounted in a vehicle interior, and particularly, to a cover configured to be engageably secured to a base member, which is to be fixed to a window glass (including a front glass, a side glass, a rear glass and the like; the same is applied hereunder), and to cover an electronic device such as a camera.

RELATED ART

In a vehicle interior of an automobile, an electronic device such as a front CCTV and a radio wave type radar is mounted as a safety system, and the electronic device is covered with a cover so as to keep an outward appearance thereof. For example, FIGS. 18A and 18B depict a camera cover disclosed in Patent Document 1, and FIG. 19 depicts a camera cover disclosed in Patent Document 2.

In 18A and 18B, a camera cover 1 has a camera accommodation part 2 configured to accommodate therein a camera and a harness accommodation part 3 configured to accommodate therein a wire harness to be connected to the camera, and the camera accommodation part 2 has engaging parts 2aa to be engaged to pins P, which are parts to be engaged of a front glass FG-side, while being slid in an imaging direction of the camera. In addition, in FIGS. 18A and 18B, the harness accommodation part 3 has a length X, which is the same as an interval between the camera accommodation part 2 and a ceiling part RH of the vehicle, an end portion 2b of the camera accommodation part 2, which is opposite to the imaging direction and the wire harness is to be inserted therein, has a slide recess extending in a direction perpendicular to a glass and a hole portion formed in the perpendicular direction, and the harness accommodation part 2 has a claw portion that is to be slidably fitted to the slide recess and a convex portion that can be fitted to the hole portion.

In FIG. 19, a camera cover 1 has an accommodation part 2a configured to accommodate therein a camera, a wall surface part located at both sides of the accommodation part 2a in a vehicle width direction, and an elastic part 3 made of a material of which stiffness is less than a main body part 2 including the accommodation part 2a and the wall surface parts, protruding rearward from the main body part 2 and contacting a ceiling part R in a vehicle. In addition, in FIG. 19, the camera cover has pins P protruding from a plurality of brackets BK, which are bonded to a front glass FG, protrude into a vehicle interior and are positioned at an inner side of the wall surface part in the vehicle width direction, toward the wall surface part, and the wall surface part has guides 2c fitted to the pins by sliding the cover forward from the rear of the vehicle along the front glass FG.

CITATION LIST

Patent Documents

Patent Document 1: JP-A-2013-184662
Patent Document 2: JP-A-2013-144475

SUMMARY OF THE INVENTION

In each of Patent Documents 1 and 2, as a structure of mounting the camera cover 1 (the camera accommodation part 2, in Patent Document 1) to the front glass FG, a structure to be engageably secured by a mutual engaging means capable of mutually engaging with each other is adopted. In the mutual engaging means, an engaging part is the plurality of pins P provided to the brackets BK fixed to the front glass FG, and an engaged part is the substantially U-shaped guides 2aa or 2c protruding from the inner wall of the camera cover 1 (the camera accommodation part 2, in Patent Document 1) and to be fitted or engaged to the corresponding pins P by sliding the cover forward from the rear of the vehicle.

However, according to the above engaging structure, it is difficult to check a position thereof from an outside of the cover. In addition, since it is necessary to position the U-shaped guide of the cover with respect to the corresponding pin of the bracket, which is a fixed side, and to insert and engage the pin into the U-shaped guide by sliding the cover forward from the rear of the vehicle from the positioned state, the mounting operability is poor. Also, even when demounting the camera cover (the camera accommodation part, in Patent Document 1), the cover should be slide rearward from the front by a length of the U-shaped guide and the cover collides with the ceiling part due to the sliding. Therefore, in Patent Document 1, the harness accommodation part should be demounted in advance, and in Patent Document 2, the cover should be strongly slid to elastically displace the rear end-side. Also, in each engaging structure, the pin is simply inserted in the U-shaped guide. Therefore, when vibrations are applied, the cover may slightly move or a friction sound may be caused in the engaging part.

The present invention has been made in view of the above situations. An object of the present invention is to provide a cover structure capable of being easily mounted and demounted, and stably keeping an engaged state and having no concerns that a friction sound will be caused in an engaging part, even when vibrations are applied. The other objects will be described later.

In order to achieve the above object, the present invention is defined with reference to a first aspect to a third aspect.

An onboard electronic device cover configured to be engageably secured to a base member, which is to be fixed to a window glass of a vehicle, to cover an electronic device which is to be held on an installation part which is one of the base member and the window glass, the onboard electronic device cover comprising:

a mutual engaging mechanism capable of mutually engaging the onboard electronic device cover with the base member, wherein the mutual engaging mechanism includes:

an engaging part provided to one of the base member and the cover;

an engaged part provided to the other of the base member and the cover and capable of engaging with the engaging part; and an urging member configured to urge the engaging part toward the engaged part, and wherein when the cover is pushed toward the window glass, the engaging part engages with the engaged part with being urged in a direction following a surface of the window glass by the urging member.

The present invention is preferably implemented, as defined in following (2) to (8).

(2) The urging member is provided to one of the base member and the cover.

(3) The urging member is provided to one of the engaging part and the engaged part.

(4) The urging member has a bending-deformable elastic piece, and engagement between the engaging part and the engaged part can be released by moving the cover against an urging direction of the elastic piece.

(5) When defined as the first aspect, the engaging part includes a pair of holding pieces having a receiving space formed therebetween, and a deviation preventing claw provided to one holding piece and protruding into the receiving space, the engaged part includes an engaging projection capable of engaging with the deviation preventing claw, and the elastic piece, and when the cover is pushed toward the window glass of the vehicle, the engaged part enters the receiving space in association with displacement of the elastic piece in the urging direction, and the engaging projection can engage with the deviation preventing claw.

(6) When defined as the second aspect, the engaging part includes a pair of holding pieces having a receiving space formed therebetween, and a deviation preventing claw provided to one holding piece and protruding into the receiving space, the other of the holding pieces is formed as the elastic piece, the engaged part includes an engaging step capable of engaging with the deviation preventing claw, and when the cover is pushed toward the window glass of the vehicle, the engaged part enters the receiving space in association with displacement of the elastic piece in the urging direction, and the engaging step can engage with the deviation preventing claw.

(7) When defined as the third aspect, the engaging part includes a concave portion opening toward an upper side of the window glass, and the elastic piece, the engaged part includes an engaging projection (75*a*) configured to engage with the concave portion, and an abutting portion configured to contact the elastic piece, and when the cover is pushed toward the window glass of the vehicle, the engaging projection can engage with the concave portion in association with displacement of the elastic piece in the urging direction via the abutting portion.

(8) The cover further includes an engaging piece provided at a tip end portion of one of the base member and the cover in a front and back direction of the vehicle, and an engaging receiving portion provided at a tip end portion of the other of the base member and the cover in the front and back direction of the vehicle, and when the cover is rotated toward the window glass by using the engaging piece as a shaft at a state where the engaging piece engages with the engaging receiving portion, the engaging part and the engaged part engage with each other.

Effects of the Invention

In the invention (1), as a main operation for engageably securing the cover to the base member by the mutual engaging means, when the cover is pushed toward the window glass at a state where the cover is arranged at a predetermined position with respect to the base member, as exemplified in FIGS. 7, 12 and 16, i.e., when the cover is pressed toward the window glass, which is an arrow direction in each FIGS. 7A, 12A and 16A, with a hand or the like, the engaged part or the engaging part can engage with the other in association with displacement in a direction of accumulating an urging force in the urging means. Thereafter, when the pressing hand is separated, the cover is slid to a position, at which the engaging part and the engaged part engage with each other, by the urging force of the urging means, as shown in each FIGS. 7A, 12A and 16A, and the engaged state is maintained in the urged state.

Therefore, in the above cover structure, as compared to Patent Documents 1 and 2, for example, since the engageably securing operation to the base member is simple and easy and the cover is urged in a direction of maintaining the engaged state, i.e., in a direction in which the engagement is difficult to be released, even when the unintentional external force is applied to the engageably secured part, the engagement is not easily released, so that it is possible to improve the mounting operability and the stable holding ability.

In the invention (4), since the urging means has the bending-deformable elastic piece and the engagement between the engaging part and the engaged part can be released by moving the cover against the urging direction of the elastic piece, as exemplified in each (a) of FIGS. 8, 13 and 17, the disengagement operation can also be easily performed when demounting the cover.

In the invention (5), in the first aspect, for example, the engaging part includes the pair of holding pieces and the deviation preventing claw provided to the base member, the engaged part is provided to the cover and includes the engaging projection and the elastic piece, and when the cover is pushed toward the window glass of the vehicle, the engaged part enters the receiving space between the holding pieces in association with displacement of the elastic piece in the urging direction, and the engaging projection can engage with the deviation preventing claw. Therefore, it is possible to implement the cover by the simple configuration, to improve the mounting operability and the stable holding ability and to easily perform the disengagement operation.

In the invention (6), in the second aspect, for example, the engaging part includes the pair of holding pieces, the deviation preventing claw and the elastic piece provided to the base member, the engaged part includes the engaging step provided to the cover, and when the cover is pushed toward the window glass of the vehicle, the engaged part enters the receiving space in association with displacement of the elastic piece in the urging direction, and the engaging step can engage with the deviation preventing claw. Therefore, also in this case, it is possible to implement the cover by the simple configuration, to improve the mounting operability and the stable holding ability and to easily perform the disengagement operation.

In the invention (7), for example, the engaging part includes the concave portion and the elastic piece provided to the base member, the engaged part includes the engaging projection and the abutting portion provided to the cover, and when the cover is pushed toward the window glass of the vehicle, the engaging projection can engage with the concave portion in association with displacement of the elastic piece in the urging direction via the abutting portion. Therefore, also in this case, it is possible to implement the cover by the simple configuration, to improve the mounting operability and the stable holding ability and to easily perform the disengagement operation.

In the invention (8), when positioning and arranging the cover with respect to the base member, one engaging piece is engaged to the other engaging receiving portion, so that it is possible to simply perform the corresponding operation. In addition, the cover is rotated toward the window glass by using the engaging piece as a shaft at the positioned state, thereby causing the engaging part and the engaged part to engage with each other. Therefore, it is possible to favorably perform the engaging operation, too.

BRIEF DESCRIPTION OF THE DRAWINGS

FIGS. 1A and 1B depicts a first aspect of the present invention, in which FIG. 1A is a pictorial view showing a relation between a base member and a cover, and FIG. 1B is a perspective view depicting the base member single product at an overturned state.

FIGS. 2A to 2C depicts the base member single product, in which FIG. 2A is a plan view, FIG. 2B is a side view seen from a lower side of the drawing sheet, and FIG. 2C is a sectional view taken along a line A-A.

FIGS. 3A to 3C depicts a holder single product that is to be fixed to the base member, in which FIG. 3A is a plan view, FIG. 3B is a side view seen from a lower side of the drawing sheet, and FIG. 3C is a sectional view taken along a line B-B.

FIGS. 4A and 4B depicts a state where the holder is engageably secured to the base member, in which FIG. 4A is a plan view, and FIG. 4B is a side view seen from a lower side of the drawing sheet.

FIGS. 5A to 5C depicts the cover single product, in which FIG. 5A is a bottom view, FIG. 5B is a sectional view taken along a line C-C, and FIG. 5C is a partial sectional view taken along a line D-D of FIG. 5A.

FIG. 6B depicts a state where an engaged part enters a receiving space of an engaging part in association with displacement of an elastic piece, and FIG. 6C depicts a state where the engaged part engages with the engaging part.

FIGS. 7A to 7B depicts an operation of engageably securing the cover to the base member, in which FIG. 7A is a pictorial view showing a process of pushing the cover toward a window glass, and FIG. 7B is a pictorial view showing a state where the cover is engageably secured to the base member.

FIGS. 8A to 8B depicts an operation of demounting the cover from the base member, in which FIG. 8A is a pictorial view showing a disengaging process of sliding the cover rearward against an urging force, and FIG. 8B is a pictorial view showing a process of demounting the cover by rotating or pulling the same toward an interior.

FIGS. 11A to 11B depicts the base member together with the cover, in which FIG. 11A is a pictorial plan view, and FIG. 11B is a sectional relation view taken along a line G-G of FIG. 11A, depicting a side of the base member.

FIGS. 12A to 12B depicts an operation of engageably securing the cover to the base member, in which FIG. 12A is a pictorial view showing a process of pushing the cover toward the window glass, and FIG. 12B is a pictorial view showing a state where the cover is engageably secured to the base member.

FIGS. 13A to 13B depicts an operation of demounting the cover from the base member, in which FIG. 13A is a pictorial view showing a disengaging process of sliding the cover rearward against the urging force, and FIG. 13B is a pictorial view showing a process of demounting the cover by rotating or pulling the same toward the interior.

FIGS. 16A to 16B depicts an operation of engageably securing the cover to the base member, in which FIG. 16A is a pictorial view showing a process of pushing the cover toward the window glass, and FIG. 16B is a pictorial view showing a state where the cover is engageably secured to the base member.

FIGS. 17A to 17B depicts an operation of demounting the cover from the base member, in which FIG. 17A is a pictorial view showing a disengaging process of sliding the cover rearward against the urging force, and FIG. 17B is a pictorial view showing a process of demounting the cover by rotating or pulling the same toward the interior.

DETAILED DESCRIPTION OF ILLUSTRATIVE EMBODIMENTS

Figure 1A:
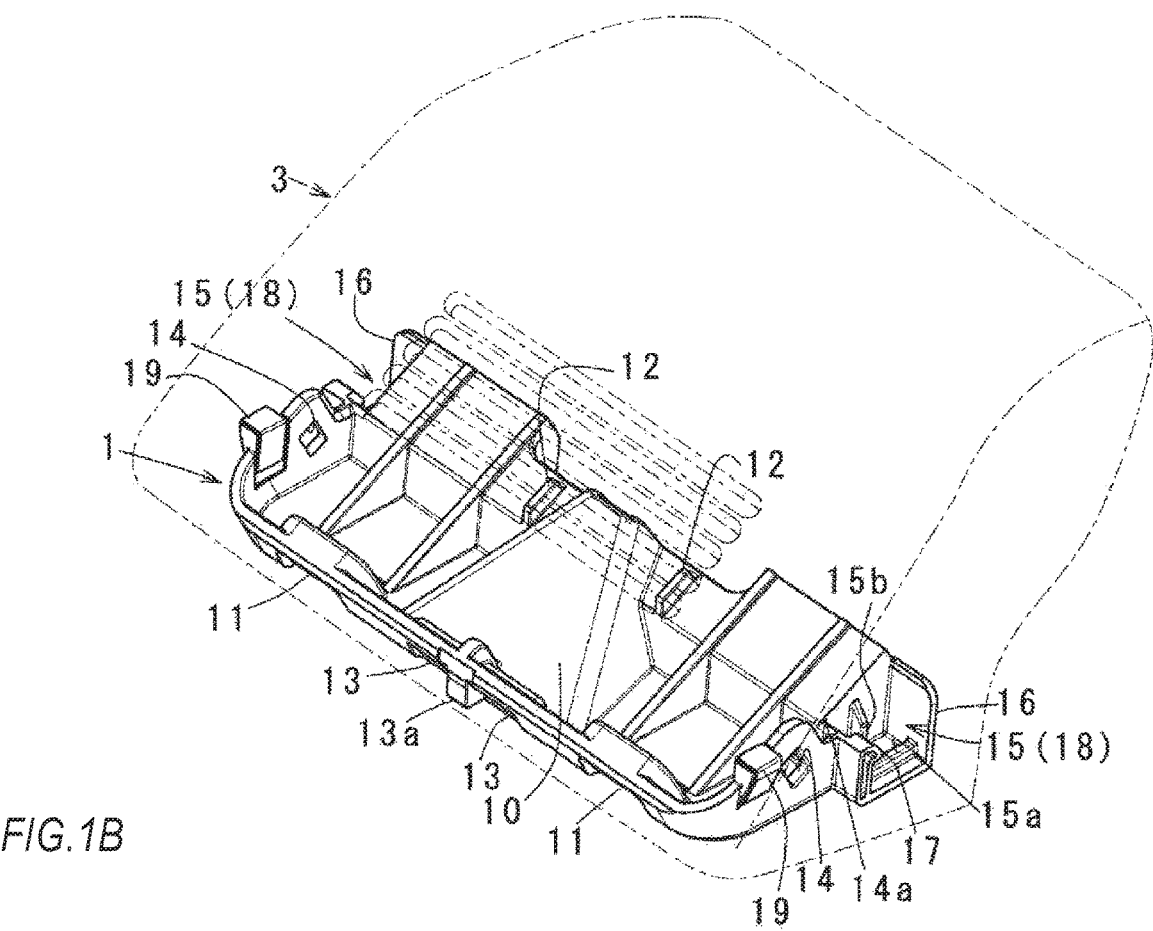
Figure 1B:
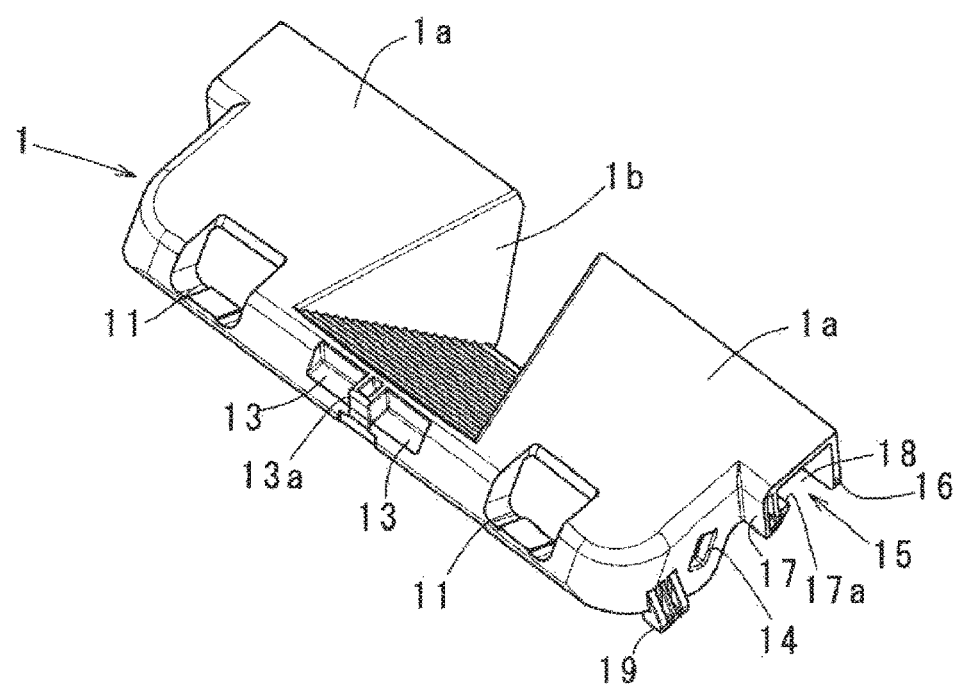
Figure 2A:
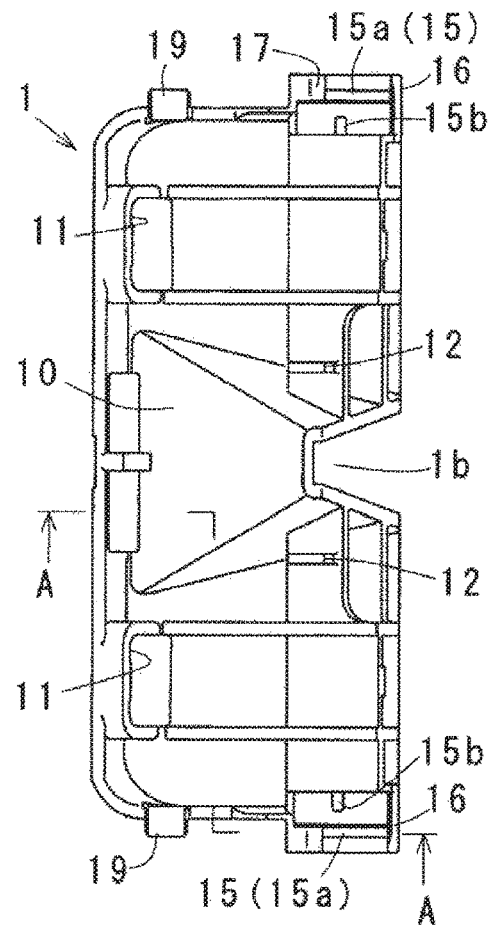
Figure 2B:
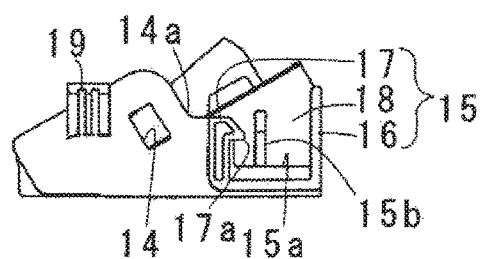
Figure 2C:
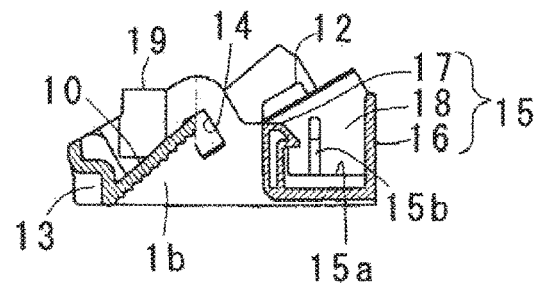
Figure 3A:
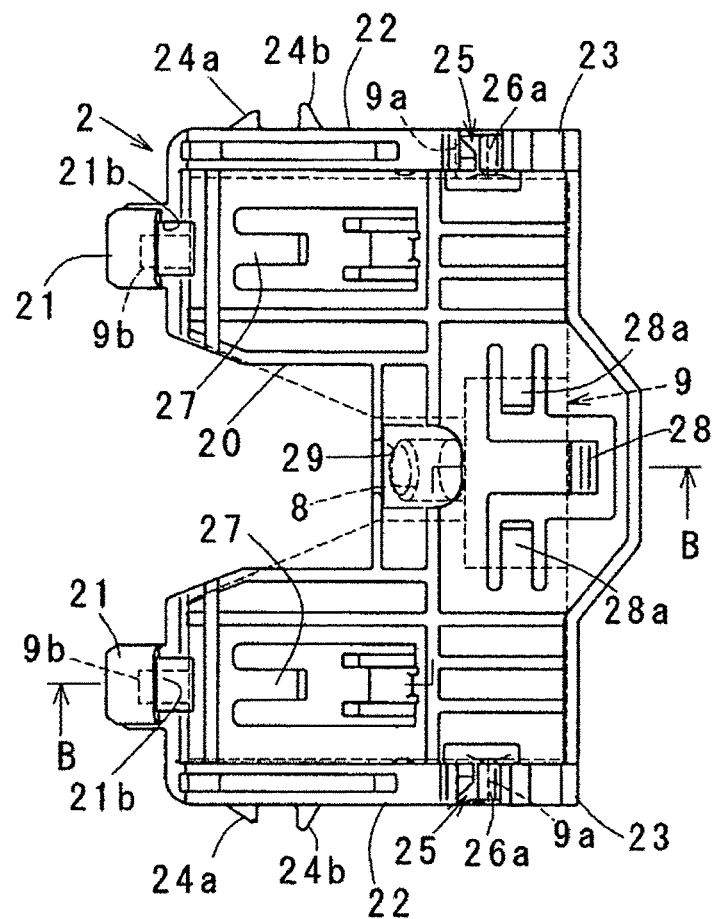
Figure 3B:
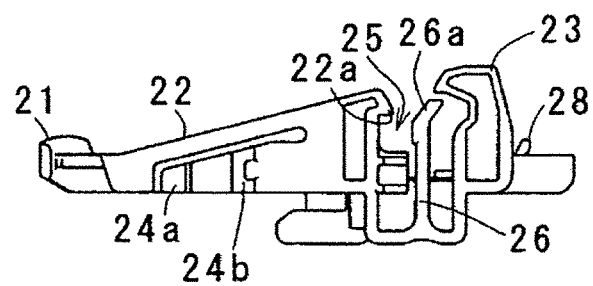
Figure 3C:
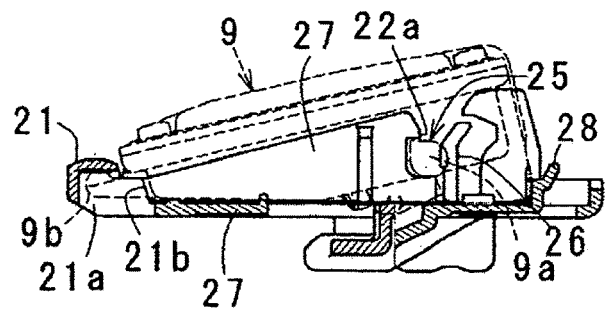

Hereinafter, each aspect of the present invention will be described with reference to the accompanying drawings. In the below, a first aspect shown in FIGS. 1A to 8B, a second aspect shown in FIGS. 9A to 13B, a third aspect shown in FIGS. 14 to 17B, and a fourth aspect shown in FIG. 20 will be sequentially described.

The invention target of each aspect is a onboard electronic device cover 3, 5, 7 configured to be engageably secured to a base member 1, 4, 6, which is to be fixed to a window glass WG of a vehicle and to cover an electronic device, which is to be held on an installation part such as the window glass and the base member. In this case, as the installation part for holding the electronic device, a holder 2 coupled to the base member 1 is used in the first aspect, and a part of the window glass WG is used in the second aspect and the third aspect. The base member 1, 4, 6, the cover 3, 5, 7, and the holder 2 are all resin molded products. However, materials other than the resin can also be used.

(First Aspect)

In FIGS. 1A to 8B, the cover 3 is engageably secured to the base member 1 by a mutual engaging means capable of mutually engaging with each other. This mutual engaging means includes an engaging part 15 provided to one of the base member 1 and the cover 3, an engaged part 35 provided to the other of the base member and the cover and configured to engage with the engaging part 15, and an elastic piece 38, which is an urging means provided to one of the engaging part 15 and the engaged part 35 and urging the engaged part 35 in a direction of engaging with the engaging part 15. When the cover 3 is pushed toward the window glass WG of the vehicle, the engaged part 35 engages with the engaging part 15 with being urged in a direction following a surface of the window glass by the elastic piece 38. The engagement can be released by moving the cover 3 against the urging direction of the elastic piece 38. In the below, the configurations are described in detail.

First, as shown in FIGS. 1A to 2B, the base member 1 has a rectangular shape that is long in a vehicle width direction. The base member 1 has mounting surfaces 1a, 1a to the window glass WG provided at right and left sides of an outer surface, a depression part 1b provided at an intermediate part in a right and left direction, i.e., between both the mounting surfaces 1a and defined by a reversed concave shape part 10, through-holes 11, 11 formed at right and left sides of an outer front side and penetrating from an inside to an outside, engaging receiving portions 13, 13 having a step shape and provided at an intermediate part of the outer front side in the right and left direction, a cover positioning convex portion 13a provided between both the engaging receiving portions 13, holder positioning projections 12, 12 located at an inner rear side and provided at both sides of a thinned rear part of the reversed concave shape part 10, and engaging holes 14, regulation portions 14a, engaging parts 15 and positioning parts 19 for the cover provided at both side surfaces in the width direction.

Figure 4A:
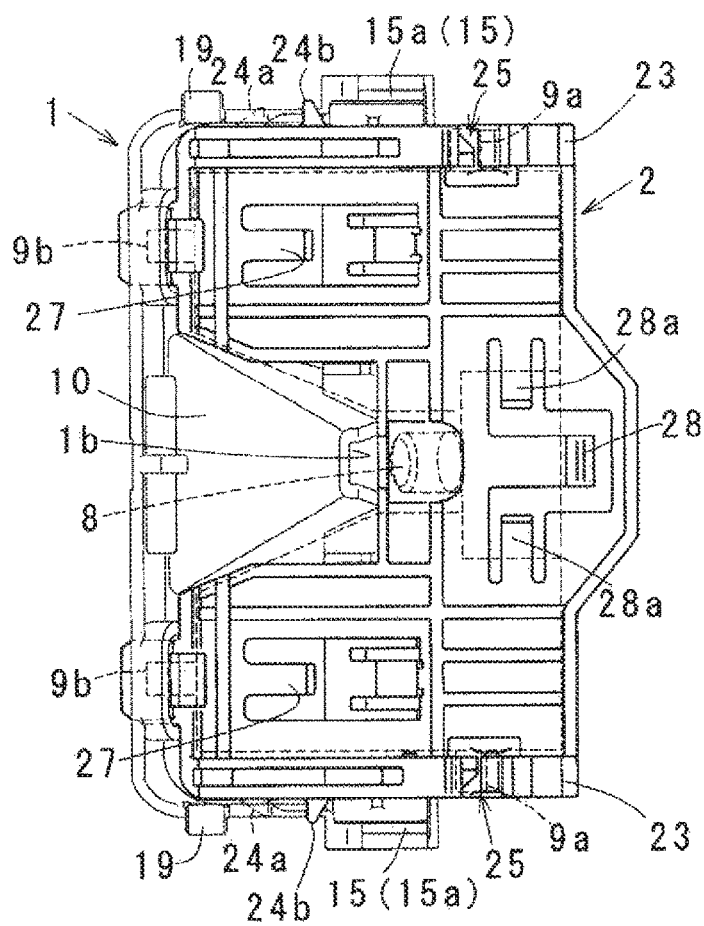
Figure 4B:
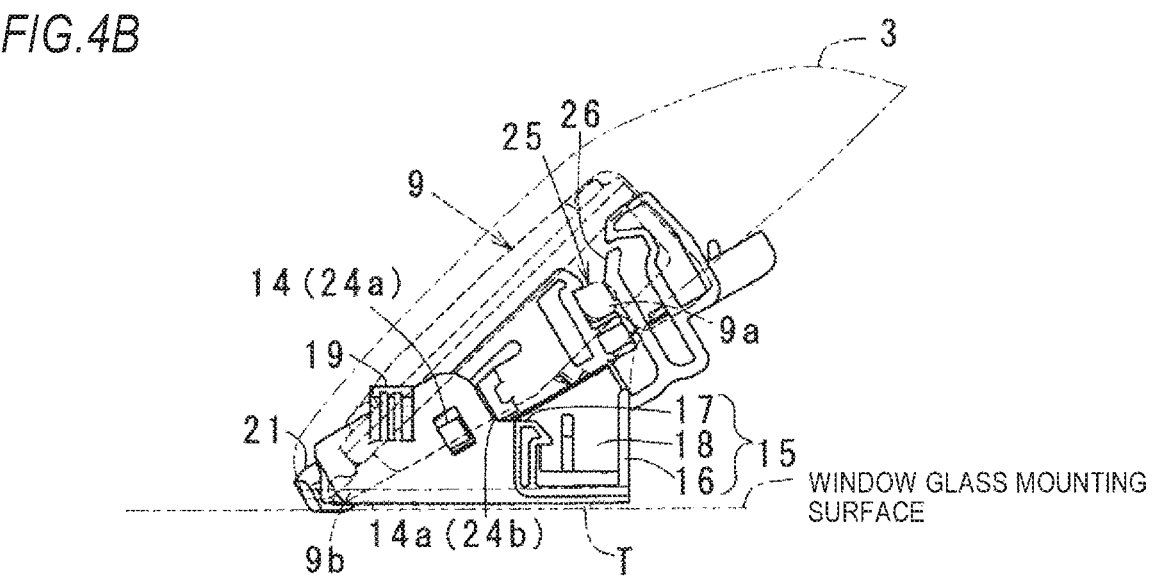

Among them, each mounting surface 1a is formed planar and is fixed to a predetermined position of the window glass WG, which is the installation part, by a double-sided adhesive tape T, an adhesive or the like, as shown in FIG. 4B. The depression part 1b is formed wider at a front side than at a rear side. As shown in FIG. 4A, at a state where a sensor module 9, which is an electronic device, is held on the holder 2 coupled to the base member 1, a camera 8 configuring the sensor module 9 can capture or monitor the front through the window glass WG from the depression part 1b.

In the meantime, the sensor module 9 is one of sensors for safe driving assistance such as a front CCTV, and is configured by mounting the camera 8, an FPGA (field-programmable gate array), a CPU, a memory and the like on a substrate, for example. Also, the sensor module 9 has projections 9a, 9a protruding from both side surfaces, projections 9b, 9b protruding from a front edge, and the like, as a mounting structure. The electronic device may be any forward-looking device, for example, a camera, a radio wave type radar, and a device having a similar configuration.

The engaging part 15 includes a pair of holding pieces 16, 17 forming a receiving space 18 therebetween, and a deviation preventing claw 17a provided at a tip end portion of one holding piece 17 and protruding into the receiving space 18. A reference numeral 15a indicates a convex portion protruding from an inner bottom surface of the receiving space 18 and configured to receive a corresponding piece portion 37 forming the engaged part 35. A reference numeral 15b indicates a piece portion for guide for easily inserting the engaged part 35 into the receiving space 18, and an upper end-side thereof is formed as an inclined surface for guide that becomes lower toward the upper. Also, as shown in FIG. 1A, the positioning part 19 is formed so that a section to be arranged on an inner surface of the cover 3 is planar and wide.

As shown in FIGS. 3A to 4B, the holder 2 forms a substantially rectangular plate shape, and has a notched part 20 provided at an intermediate part of a front side in the right and left direction and configured to receive the reversed concave shape part 10, insertion parts 21, 21 protruding from front tip ends of right and left parts dividing the notched part 20 and configured to be fitted in the corresponding through-holes 11, upright walls 22, 22 provided at both sides and configured to be gradually lower from a rear side toward a front side, an upright wall 23 provided in parallel with each upright wall 22 and forming a vertical hole between the upright wall 23 and a rear end face of the upright wall 22, an elastic engaging piece 26 provided to protrude out from an inner bottom surface of the vertical hole and forming an engaging space 25 between the elastic engaging piece and the rear end face of the upright wall 22, a pair of claws 24a, 24b protruding from an outer surface of each upright wall 22, and the like.

As shown in FIGS. 3A to 4B, each insertion part 21 is formed to have a longitudinal section of a substantially reversed L-shape, and has an inner space 21a and an opening 21b in communication with the upper and lower. The rear end face of each upright wall 22 is provided with a deviation preventing claw 22a protruding from the upper into the engaging space 25. The elastic engaging piece 26 has a guide surface 26a provided at an upper end and positioned at an outermore side of the engaging space 25 from the lower toward the upper. Also, a holding part for placing thereon the sensor module 9 is provided with piece portions 27, 28a configured to elastically hold a bottom surface-side of the sensor module 9, an engaging piece 28 to be press-contacted and engaged to a rear surface of the sensor module 9, a concave portion 29 configured to receive the camera 8 of the sensor module 9, and the like.

The holder 2 is coupled to the base member 1 with each insertion part 21 being fitted to the corresponding through-hole 11 and each of the claws 24a, 24b being engaged to the corresponding engaging hole 14 and regulation portion 14a. In this coupling structure, in order to maintain the stable coupled state, it is preferably to interpose a buffer material such as a felt (not shown) at a place at which the holder 2 and the base member 1 overlap with each other.

At a state where the projections 9a on both side surfaces of the sensor module 9 are engaged with the corresponding engaging spaces 25 and the projections 9b on the front edge are engaged with the inner spaces 21a, the rear surface of the sensor module is elastically engaged to the holder 2 by the engaging piece 28, so that the sensor module is coupled and maintained. The holder 2 is set to have an optimal shape in correspondence to the target electronic device. Also, the holder 2 can be omitted when the electronic device is fixed to the window glass WG by the double-sided adhesive tape or the like.

Figure 5A:
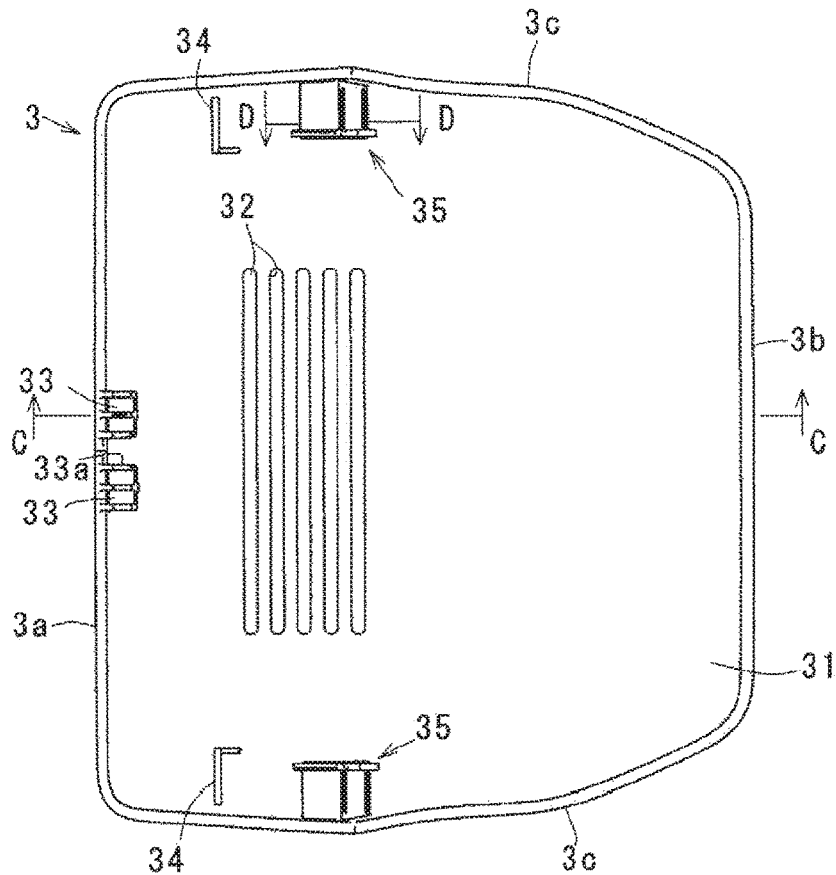
Figure 5B:
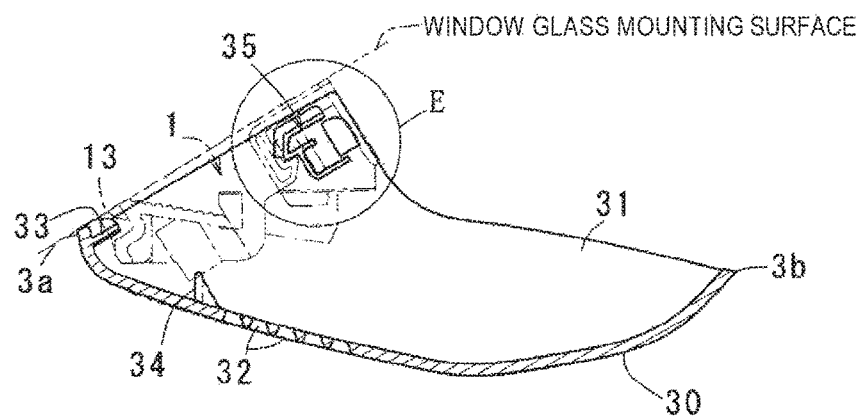
Figure 5C:
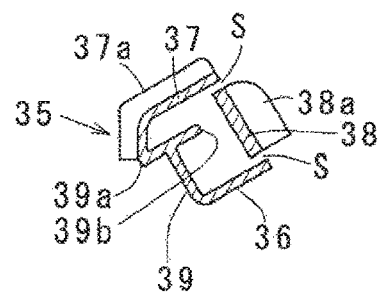

Meanwhile, as shown in FIGS. 5A to 5C, the cover 3 has an outer surface 30, which is a design surface, and an internal part 31, which is configured as an accommodation part capable of arranging therein the base member 1 and the holder 2 coupled to each other. A rear end 3b is a side spaced from the window glass WG, and has a width size slightly smaller than a front end 3a. The cover 3 has engaging pieces 33, 33 protruding from an inner surface at an intermediate part of the front end 3a in the right and left direction and configured to engage with the engaging receiving portions 13, 13, a concave portion 33a provided between both the engaging pieces 33 and configured to be fitted with the convex portion 13a, contact walls 34 protruding from a planar surface of the internal part 31 and configured to contact the positioning parts 19, and the parts to be engaged 35 protruding from inner surfaces of both side ends 3c and configured to releasably engage with the engaging parts 15. A reference numeral 32 indicates a plurality of lateral recesses provided to a main part of the cover 3.

Each engaging piece 33 has a flat inner surface with protruding from a raised inner surface of the front end 3a of the cover. When the cover is rotated and pushed toward the window glass WG by using the engaging pieces 33 as a shaft at a state where each engaging piece 33 is contacted, i.e., engaged to a step of the engaging receiving portion 13, the parts to be engaged 35 enter the receiving spaces 18 of the engaging parts 15 while the contact walls 34 collide with the positioning parts 19 and slide along the positioning parts, so that the cover 3 is engaged with the base member 1.

The respective parts to be engaged 35 face each other in the width direction with protruding from raised inner surfaces of both the side ends 3c of the cover. Each engaged part 35 has a substantially rectangular cylinder shape, and has piece portions 36, 37 facing each other and other piece portions 38, 39 facing each other. Among them, the piece portion 39 has an engaging projection 39a, which is formed by protruding outward a portion positioned between the piece portion 39 and the piece portion 37 and can engage with the claw 17a, and a restraint piece portion 39b protruding in an opposite side to the engaging projection 39a, i.e., into the cylinder shape. A part of the piece portion 37 and the engaging projection 39a is provided with a collar portion 37a protruding outward from a tip end. The collar portion 37a collides with the inclined surface of the tip end of the piece portion for guide 15b of the receiving space-side and slides from the collision portion to the inner bottom surface of the receiving space 18 along the piece portion 15b when the engaged part 35 enters the receiving space 18 of the engaging part. At this state, a part of the piece portion 37 is in contact with the convex portion 15a.

Figure 6A:
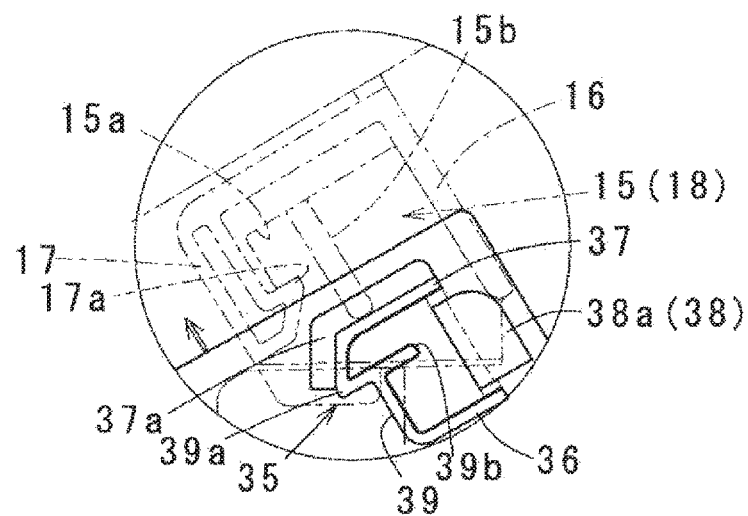
FIGS. 6A to 6C is an enlarged view of an E part of FIG. 5B.
Figure 6B:
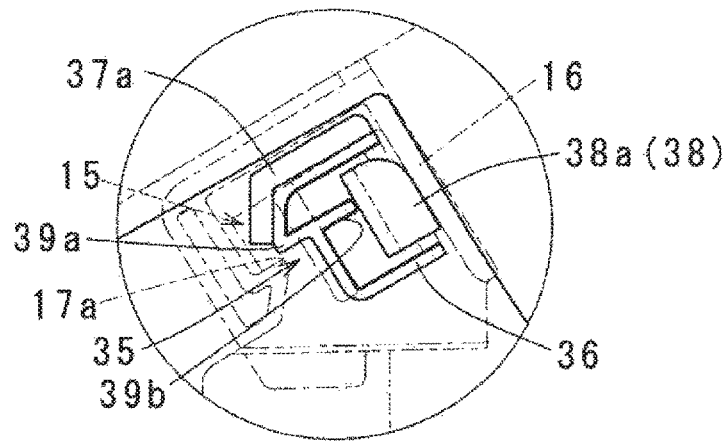
Figure 6C:
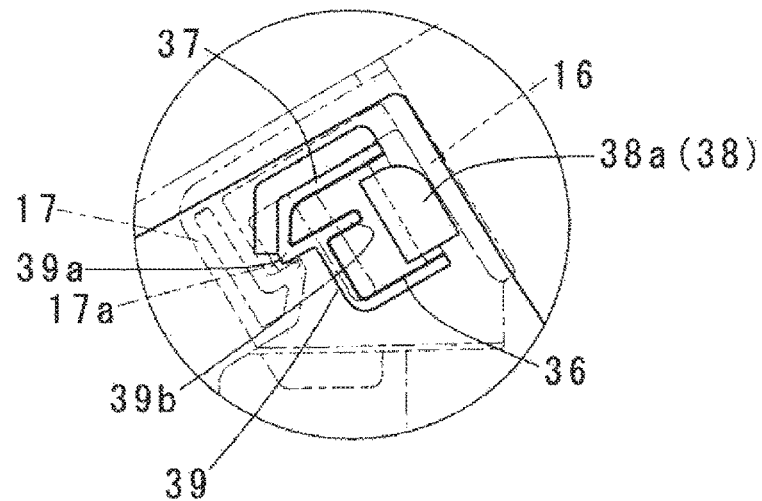

The piece portion 38 is separated at both sides from the piece portions 37, 36 by vertical slits S, so that it is formed as a bending-deformable elastic piece. In the below, the corresponding piece portion is referred to as 'elastic piece 38'. The elastic piece 38 has a collar portion 38a protruding outward from a tip end thereof, and is configured to be swingably displaced into the cylinder shape via the collar portion 38a. In this case, at a stage before the engaged part 35 enters the receiving space 18, the elastic piece 38 is at an initial position at which it does not exhibit an urging force, as shown in FIG. 6A, and when the engaging projection 39a collides with the claw 17a and then overrides the claw 17a while the engaged part 35 is entering the receiving space 18, the elastic piece is elastically displaced into the cylinder shape by a reactive force applied from the holding piece 16 until it collides with the restraint piece portion 39b, and accumulates the maximum urging force, as shown in FIG. 6B. After the engaging projection 39a overrides the claw 17a, as shown in FIG. 6C, the engaged part 35 is slightly moved in an engaging direction of the engaging projection 39a and the claw 17a by the urging force accumulated in the elastic piece 38. The elastic piece 38 urges the engaged part 35 in a direction of maintaining the engaged state.

(Operations)

Figure 7A:
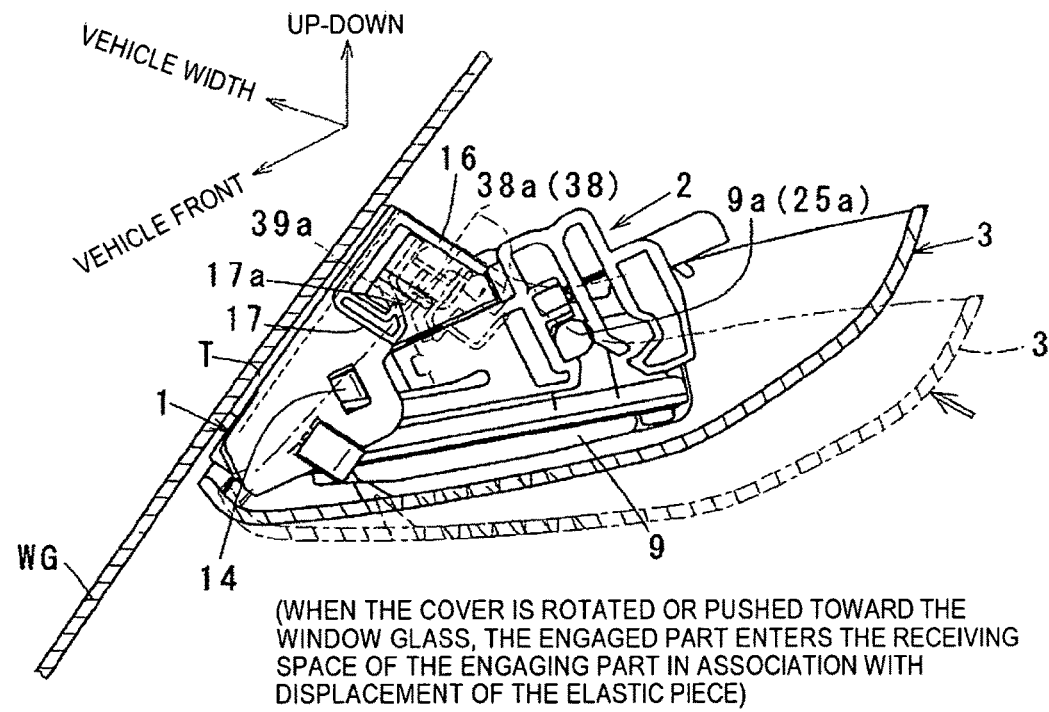
Figure 7B:
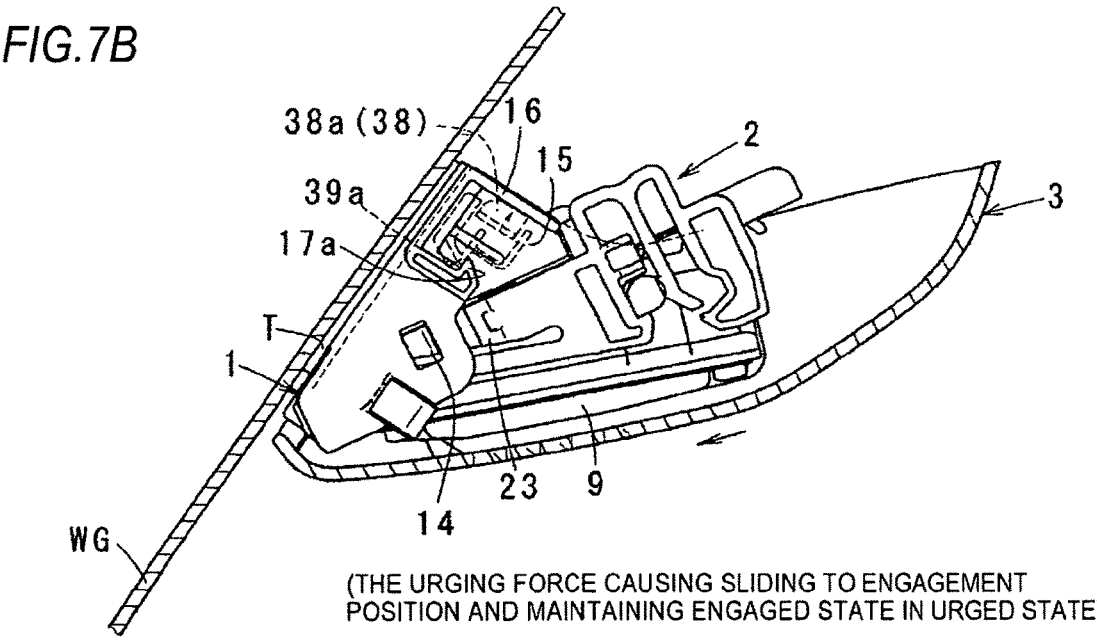
Figure 8A:
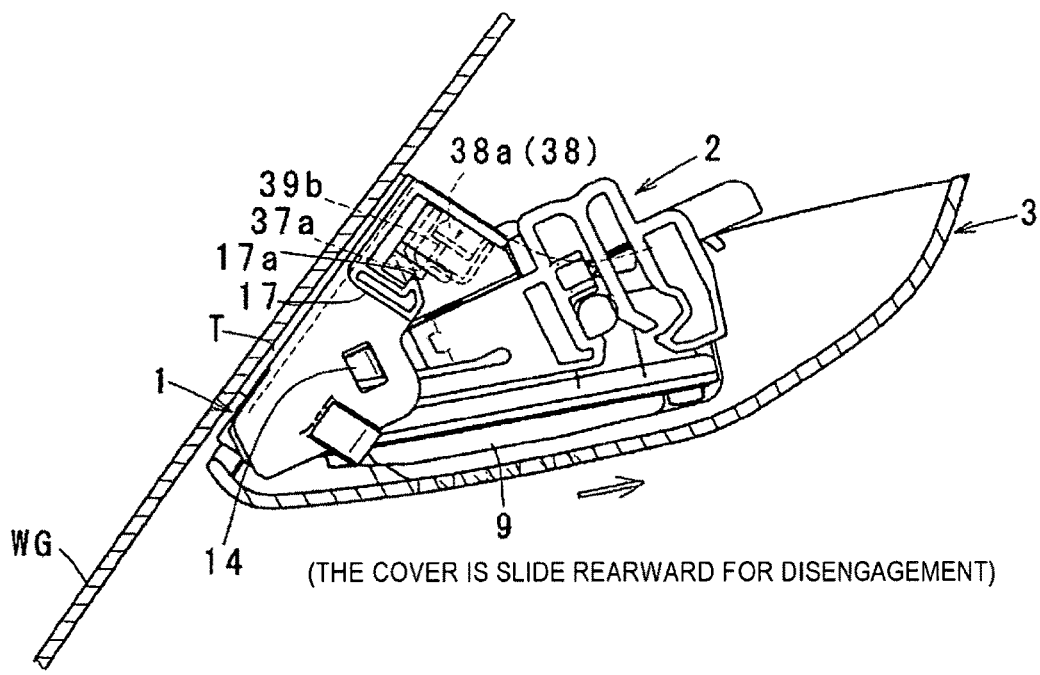
Figure 8B:
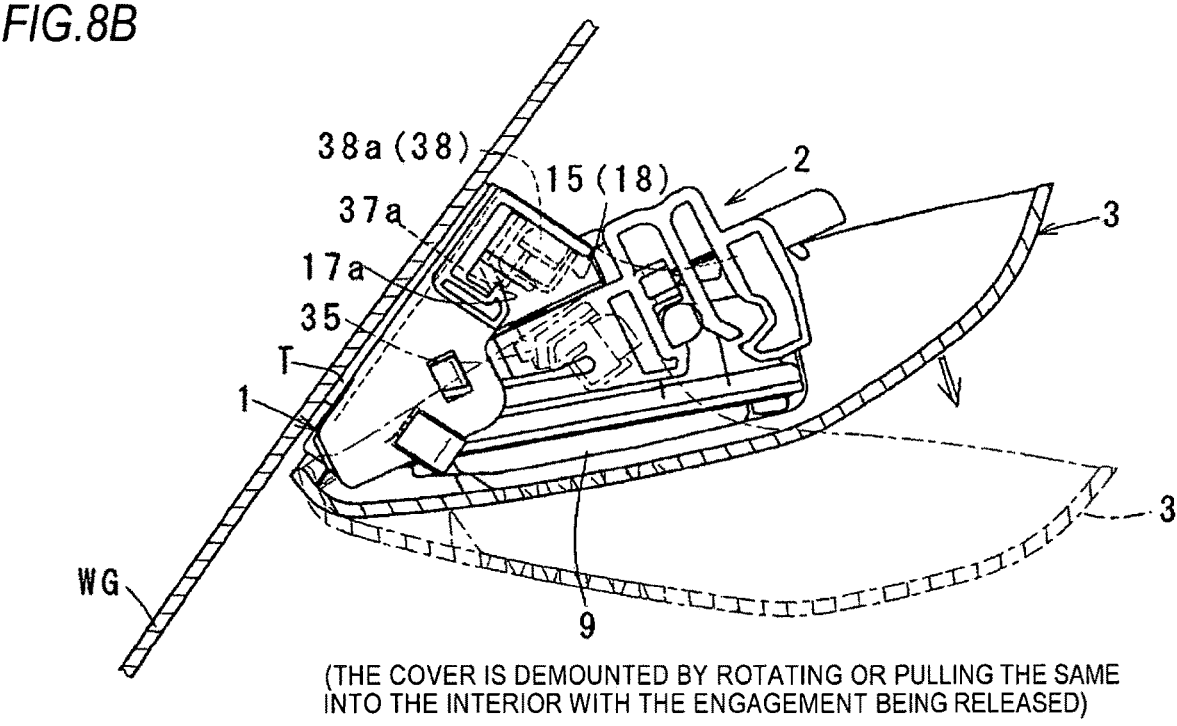

FIGS. 7A and 7B depicts an operation example, which is performed when fixing the base member 1 to the determined installation part of the window glass WG of the vehicle by the double-sided adhesive tape T or the like at a state where the holder 2 is engageably coupled to the base member 1 and the sensor module 9 is held at the holder 2 and engageably securing the cover 3 to the base member 1 from the attached state. FIGS. 8A and 8B depicts an operation example, which is performed when demounting the cover 3 again due to maintenance or the like.

(A) In a main operation that is performed when engageably securing the cover 3 to the base member 1, as shown with the dashed-dotted line in FIG. 7A, when the cover 3 is arranged at a predetermined position with respect to the base member 1, i.e., when the concave portion 33a of the cover is fitted to the convex portion 13a of the base member, the engaging piece 33 of the cover is engaged to the engaging receiving portion 13 of the base member. At this positioned state, the cover 3 is rotated or pushed toward the window glass WG. That is, when the cover 3 is pressed toward the window glass WG, which is an arrow direction of FIG. 7A, by a hand or the like, the elastic piece 38 is displaced in the direction of accumulating the urging force, as shown in FIG. 6B, so that the claw 17a and the engaging projection 39a can engage with each other, as described above. Thereafter, when the pressing hand is separated, the cover 3 is moved by a slight amount in an arrow direction of FIG. 7B by a part of the urging force accumulated in the elastic piece 38, as shown in FIGS. 7B and 6C, so that the engaging projection 39a engages with the claw 17a and the engaged state is maintained in the state urged by the elastic piece 38.

(B) In the above cover structure, the operation of engageably securing the cover 3 to the base member 1 is simply to push the cover toward the window glass WG, and it is possible to implement one touch operation, as compared to the configuration of sliding the cover along the surface of the window glass, as disclosed in Patent Document 1 or 2. Also, at the state where the cover 3 is engageably secured to the base member 1, the engaged part 35 is urged in the receiving space 18 in the direction of maintaining the engaged state, i.e., in the direction in which the engagement is difficult to be released by a part of the urging force accumulated in the elastic piece 38, as shown in FIG. 6C. For this reason, in the above structure, even when the unintentional external force is applied to the engageably secured part, the engagement is not easily released, so that it is possible to improve the mounting operability and the stable holding ability.

(C) In a main operation that is performed when demounting the cover 3 due to the maintenance or the like, when the cover 3 is slightly slid in an arrow direction of FIG. 8A, i.e., in a direction of separating from the window glass WG, the elastic piece 38 is retreated into the cylinder shape until it collides with the restraint piece portion 39b, as shown in FIG. 6B, and the engaging projection 39a is disengaged from the claw 17a. From this state, the cover 3 is demounted by rotating or pulling the same in an arrow direction of FIG. 8B, i.e., from the window glass WG toward the inside of the vehicle interior. In other words, in the above structure, since the engagement between the engaging part 15 and the engaged part 35, i.e., the engaging projection 39a engaged to the claw 17a can be released by sliding the cover 3 against the urging direction of the elastic piece 38, as shown in FIGS. 8A and 6B, the disengaging operation can also be easily performed when demounting the cover 3.

(Second Aspect)

A second aspect is different from the first aspect, in that the electronic device such as the camera (not shown) is fixed to the window glass WG by the double-sided adhesive tape or the like, and a base member 4 and a cover 5 are held or covered, including the wire harness connected to the electronic device. That is, in FIGS. 9 to 13, the base member 4 includes a main body part 40 having a substantially rectangular shape and provided to escape the electronic device fixed to the window glass WG, and a harness holding part 41 configured to hold the wire harness. The cover 5 includes a main part 50 configured to cover the main body part 40 and an extension part 51 configured to cover the harness holding part 41.

The main part 50 is engageably secured to the main body part 40 by a mutual engaging means capable of mutually engaging with each other. This mutual engaging means includes an engaging part 45 provided to one of the main body part 40 and the main part 50, an engaged part 55 provided to the other of the main body part 40 and the main part 50 and configured to engage with the engaging part 45, and an elastic piece 48, which is an urging means provided to one of the engaging part 45 and the engaged part 55 and urging the engaged part 55 in a direction of engaging with the engaging part 45. In the meantime, the extension part 51 is engageably secured to the harness holding part 41 by a mutual engaging means capable of mutually engaging with each other. This mutual engaging means includes a swinging piece 43, which is an engaging part provided to one of the harness holding part 41 and the extension part 51, and a projection 57 provided to the other of the harness holding part 41 and the extension part 51 and configured to engage with the swinging piece 43. When the cover 5 is pushed toward the window glass WG of the vehicle, the engaged part 55 engages with the engaging part 45 with being urged in the direction following the surface of the window glass by the elastic piece 38, and the projection 57 engages with the corresponding swinging piece 43. This engagement can be released by moving the cover 5 against the urging of the elastic piece 38. In the below, the configurations are described in detail.

First, as shown in FIGS. 9 to 11B, the base member 4 has the main body part 40, which has a substantially rectangular frame shape for escaping the electronic device by a hole portion 40a in the frame, and the harness holding part 41, which integrally protrudes rearward from one corner of a rear side of the frame shape of the main body part 40. The main body part 40 and the harness holding part 41 have flat lower surfaces, respectively, and are fixed to predetermined positions of the window glass WG, which are the installation part, by the double-sided adhesive tape T, the adhesive, or the like, as shown in FIGS. 12A and 12B.

Figure 10A:
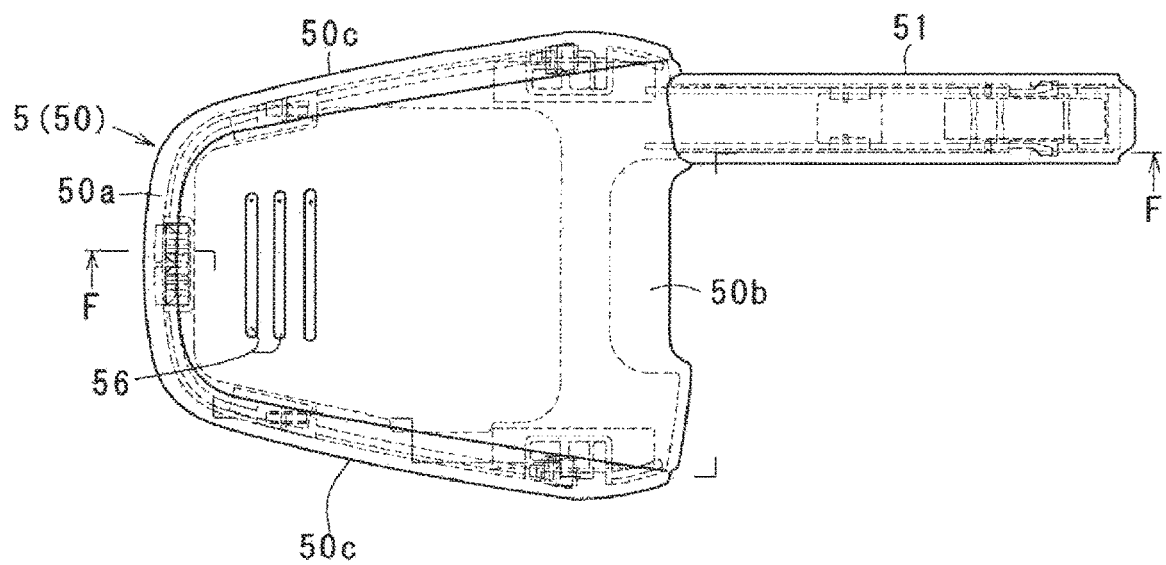
FIG. 10A is a plan view of the cover engageably secured to the base member.
Figure 10B:
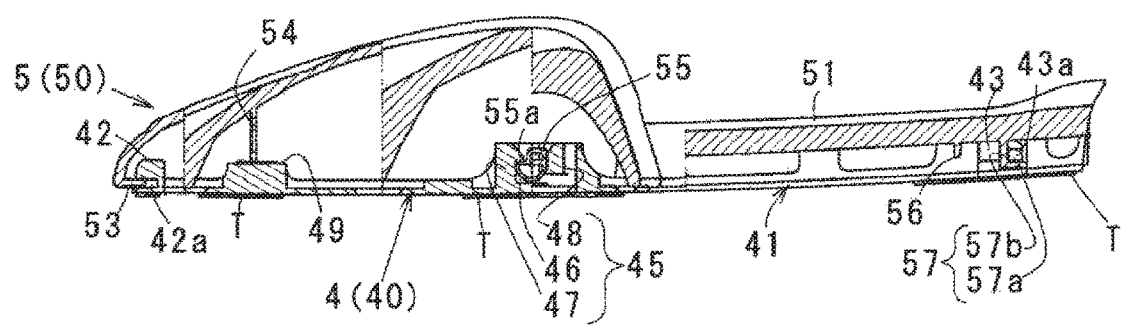
FIG. 10B is a sectional view taken along a line F-F.

The main body part 40 has an engaging receiving portion 42a provided at an intermediate part of a front side in the right and left direction and having a lateral hole shape, engaging parts 45 provided to face each other at right and left sides of the rear side, and positioning parts 49 provided to face each other at front portions of both sides and configured to position the cover 5. Among them, the engaging receiving portion 42a is formed by removing rearward a thickness of a small block part 42, which is provided at an intermediate part of a front side of an upper surface of the main body part 40, from the front side of the small block 42, as shown in FIGS. 10A and 10B. The positioning part 49 is a part for positioning a height direction of the cover 5 with respect to the main body part 40.

Figure 11A:
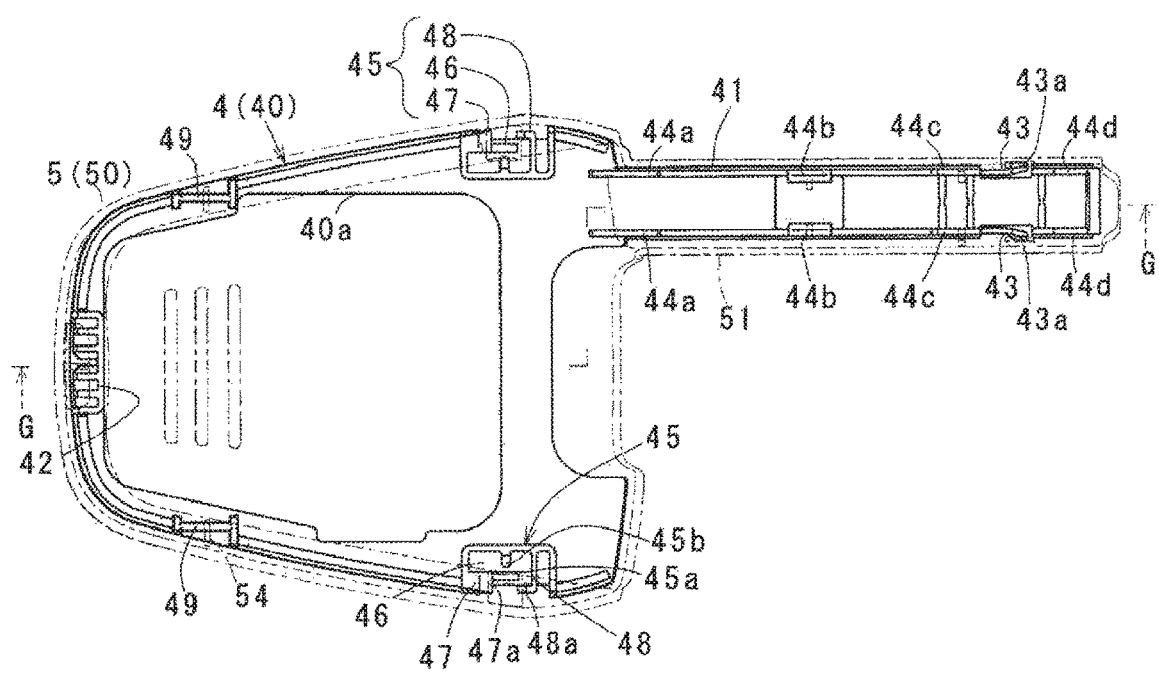
Figure 11B:
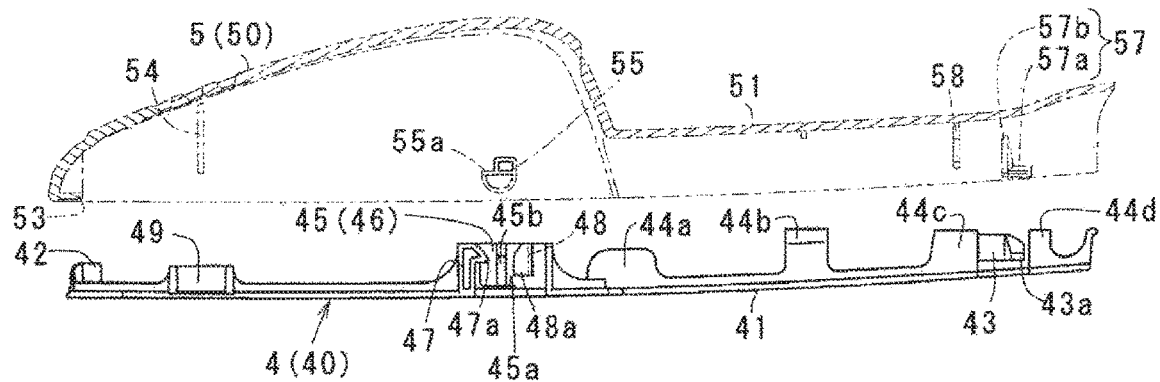
Figure 12A:
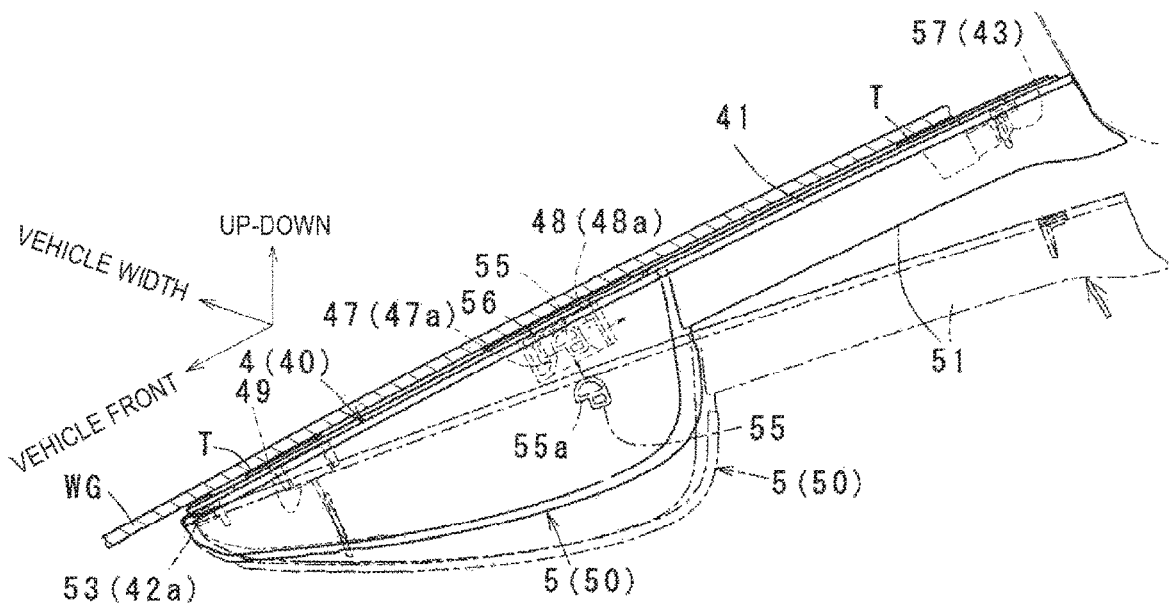
Figure 12B:
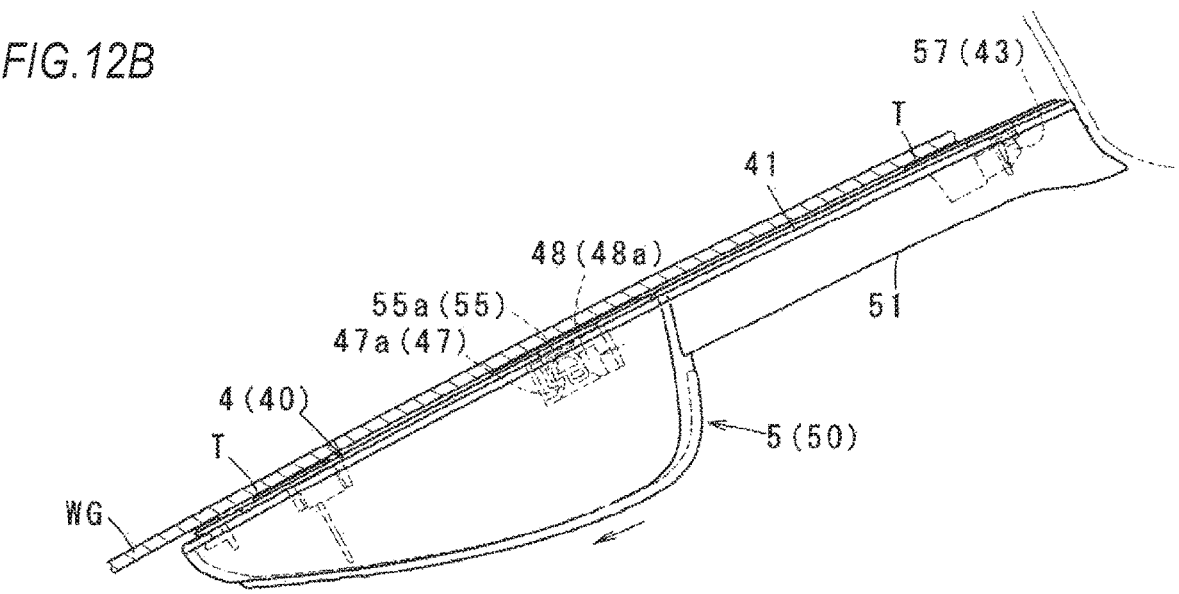

As shown in FIGS. 11A and 11B, a U-shaped wall part provided at each of both sides of the rear side of the upper surface of the main body part 40 and having an opened outer side is used as the engaging part 45. The U-shaped front piece portion is configured as one holding piece 47, an intermediate piece portion protruding into the U shape and facing the holding piece 47 is configured as the other holding piece 48, and a receiving space 46 is defined between both the holding pieces 47, 48. The holding piece 47 has a deviation preventing claw 47a provided at a tip end and protruding into the receiving space 46. The holding piece 48 is formed as an elastic piece protruding from the U-shaped intermediate piece portion and configured to be swingably displaceable. In the below, this holding piece is referred to as 'elastic piece 48'. The elastic piece 48 has a claw 48a provided at a tip end thereof and protruding into the receiving space 46, and is configured to be swingably displaced by a load to be applied to the claw 48a. The claw 48a has an inclined surface that is provided at an upper side and becomes lower toward the tip end. A reference numeral 45a indicates a rib protruding from an inner bottom surface of the receiving space 46 and configured to receive the engaged part 55. A reference numeral 45b indicates a piece portion for guide for easily inserting the engaged part 55 into the receiving space 46, which has an inclined surface that is provided at an upper side and more protrudes toward the lower.

The elastic piece 48 operates in the similar manner to the elastic piece 38 of the first aspect. That is, at a stage before the engaged part 55 enters the receiving space 46, the elastic piece 48 is at an initial position at which it does not exhibit an urging force, as shown in FIG. 11B, and when the elastic piece collides with the claw 47a and then overrides the claw 47a while the engaged part 55 is entering the receiving space 46, the elastic piece is elastically displaced to the outside of the receiving space 46 by a reactive force applied from the holding piece 47, and accumulates the maximum urging force, as shown in FIG. 12A. After the engaged part 55 overrides the claw 47a, as shown in FIG. 12B, the engaged part 55 engages with the claw 47a. That is, the cover 5 is slightly moved by the urging force accumulated in the elastic piece 47 in the direction in which the engaged part 55 engages with the claw 47a. The elastic piece 48 urges the engaged part 55 in the direction of maintaining the engaged state.

The harness holding part 41 is a part configured to hold the wire harness connected to the electronic device, and has a plurality of restraint portions 44a, 44b, 44c, 44d, and a pair of swinging pieces 43 provided between the restraint portions 44c and 44d and configured to be swingably displaceable in the width direction. The restraint portions 44a, 44b, 44c, 44d are configured by holding pieces facing each other and configured to restrain the wire harness therebetween. The swinging pieces 43 provided at both sides protrude from end faces of both the holding pieces configuring the restraint portions 44c, as shown in FIG. 11B, and extend up to the front of the corresponding holding pieces configuring the restraint portions 44d. Also, each swinging piece 43 has a claw 43a provided at a tip end and protruding outward, and maintains a predetermined interval between the claw 43a and the corresponding holding piece configuring the restraint portion 44d.

Figure 9:
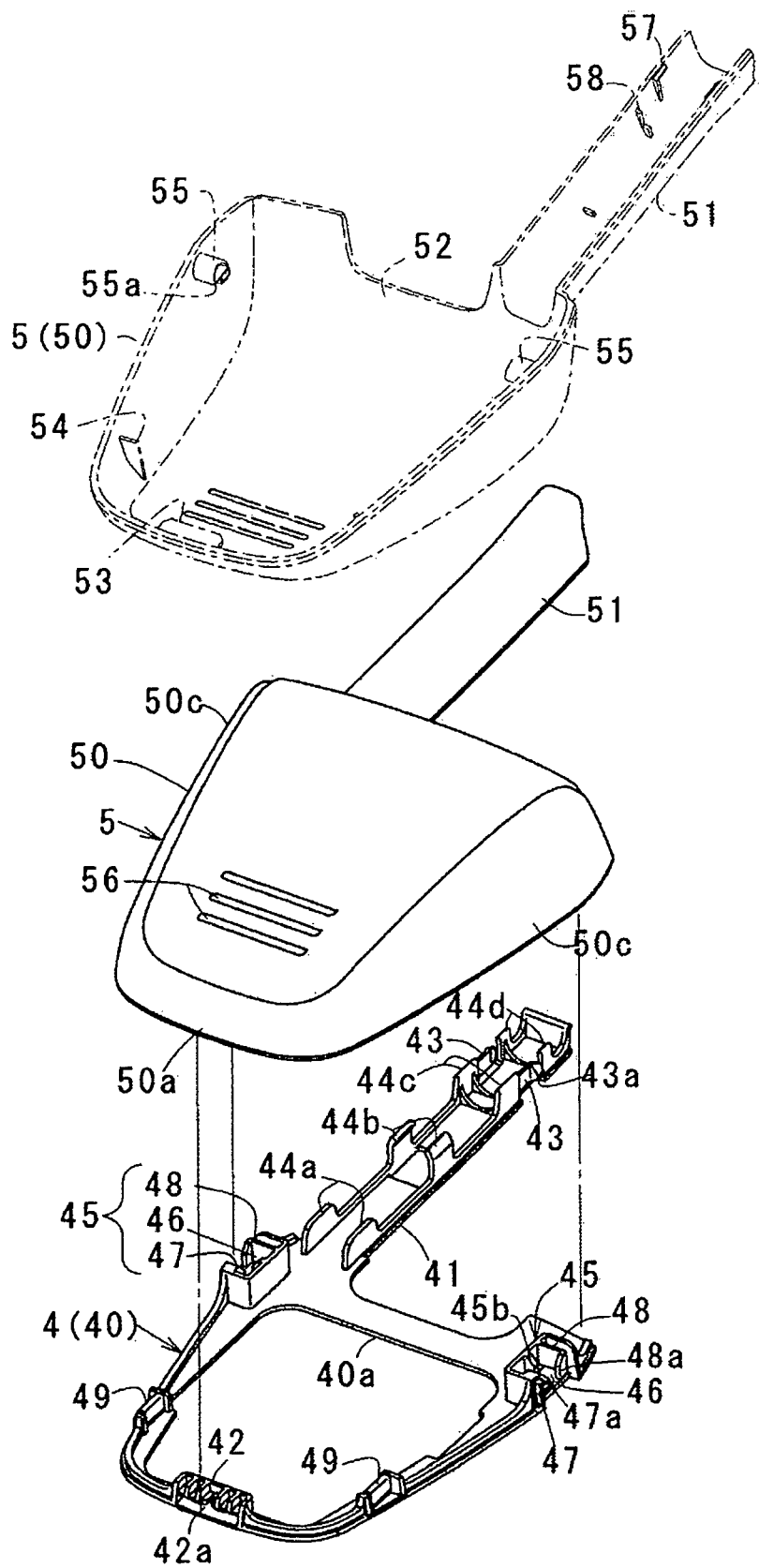
FIG. 9 is an exploded perspective view of a cover and a base member, depicting a second aspect of the present invention.

In the meantime, the main part 50 of the cover 5 has an internal part 52, which is configured as an accommodation part having a size capable of covering the electronic device to be fixed to the window glass WG, as shown in FIG. 9. A front end 50a has a width size slightly smaller than a rear end 50a. The main part 50 has an engaging piece 53, which protrudes from an intermediate inner surface of the front end 50a in the right and left direction and is to be fitted to the engaging receiving portion 42a, contact walls 54, which protrude from inner front sides of both side ends 50c and are to contact the positioning parts 19, and a pair of parts to be engaged 55, which protrude from inner rear sides of both the side ends 50c and are to releasably engage with the engaging parts 45. Each of the parts to be engaged 55 has a shaft shape, which has a diameter greater than an interval between the claw 47a and the claw 48a at the initial position of the elastic piece 48, and is provided with an engaging step 55a provided at a front upper side and configured to engage with the claw 47a, as shown in FIG. 11B. A reference numeral 56 indicates a plurality of lateral recesses provided to the main part 50.

The extension part 51 has regulation ribs 58 provided on an inner surface thereof and piece portions 57 configured to releasably engage with the respective swinging pieces 43. The regulation rib 58 is configured to restrain the wire harness held in the harness holding part 41 from above. The piece portion 57 has a substantial L-shape, and is configured by a laterally rib-shaped engaging projection 57a configured to engage with a lower surface of the claw 43a, and a vertically rib-shaped pressing projection 57b configured to collide with the claw 43a and to cause the swinging piece 43 to be elastically displaced inward.

(Operations)

Figure 13A:
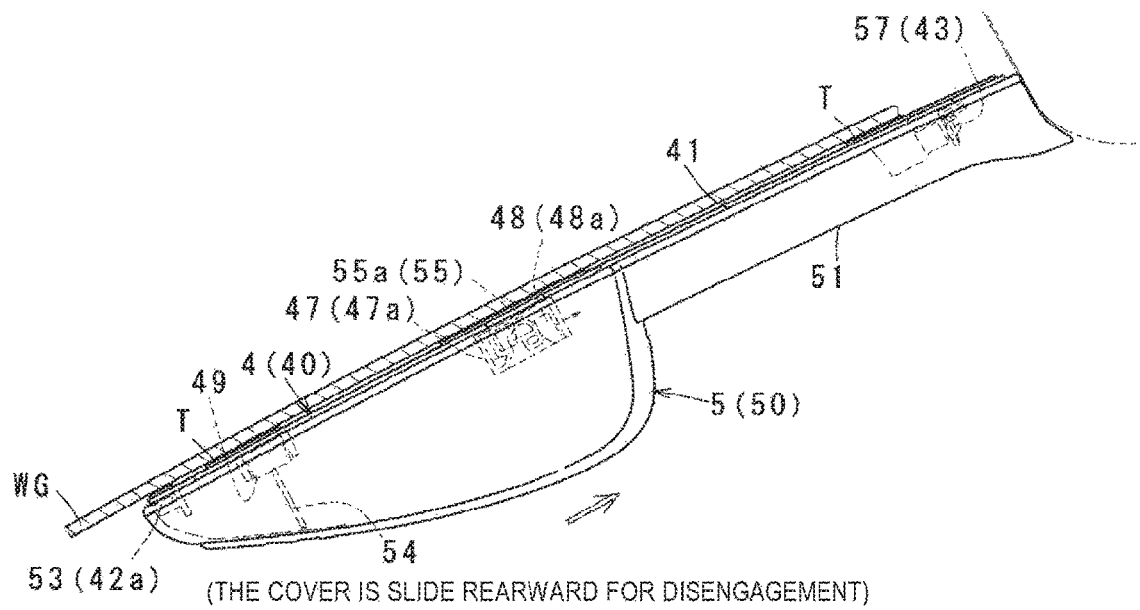
Figure 13B:
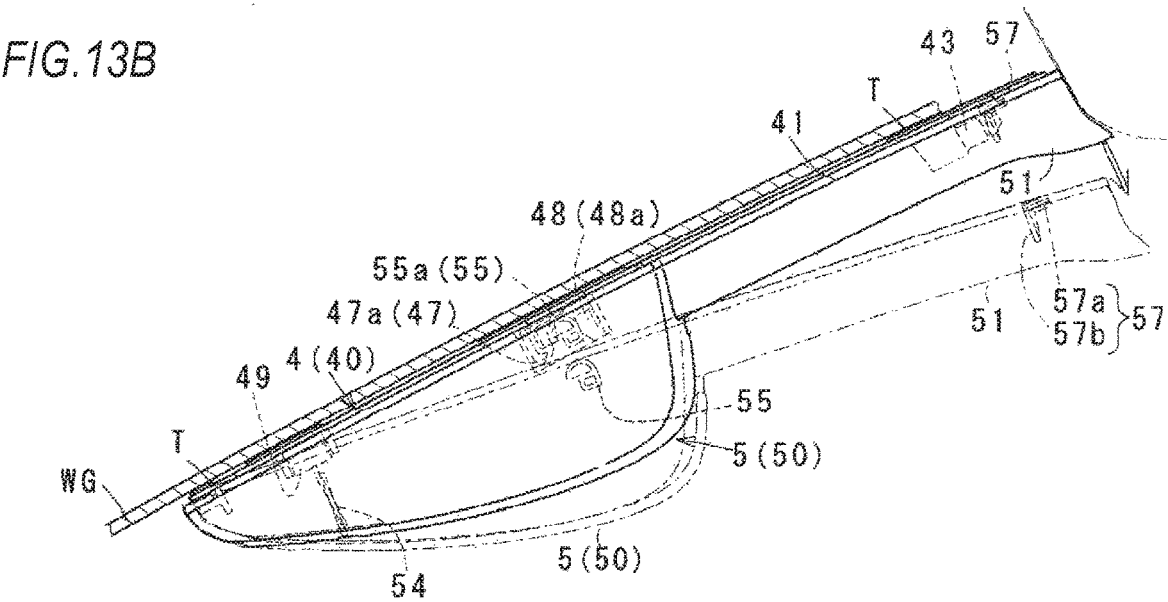

FIGS. 12A and 12B depicts an operation example, which is performed when fixing the base member 4 to the determined position of the window glass WG of the vehicle by the double-sided adhesive tape T or the like and engageably securing the cover 5 to the base member 4 from the attached state. FIGS. 13A and 13B depicts an operation example, which is performed when demounting the cover 5 again due to the maintenance or the like.

(A) In a main operation that is performed when engageably securing the cover 5 to the base member 4, as shown with the dashed-dotted line in FIG. 12A, the cover 5 is arranged at a predetermined position with respect to the base member 4, i.e., the engaging piece 53 of the cover is fitted to the engaging receiving portion 42a of the base member. At this positioned state, the cover 5 is rotated or pushed toward the window glass WG. That is, the cover 5 is pressed toward the window glass WG, which is an arrow direction of FIG. 12A, by a hand or the like. Then, as described above, the elastic piece 48 of the engaging part 45 of the main part is pushed to the engaged part 55 and is displaced in the outward direction of accumulating the urging force, as shown in FIG. 12A. The engaged part 55 enters the receiving space 46 from between the claw 47a and the claw 48a by the displacement of the elastic piece 48, so that the claw 47a and the engaging step 55a can engage with each other. At the same time, the pressing projection 57b of the piece portion 57 of the extension part collides with the claw 43a, so that the swinging piece 43 is swingably displaced inward. Thereafter, when the pressing hand is separated, the cover 5 is slightly (about 2 mm, in this example) moved in an arrow direction of FIG. 12B by a part of the urging force accumulated in the elastic piece 48. As a result, the engaging step 55a is engaged with the claw 47a and the engaged state is maintained in the state urged by the elastic piece 48. At the same time, the swinging piece 43 is elastically returned to its initial position as the pressing projection 57b is disengaged from the claw 43a. At this time, the engaging projection 57a is engaged to the lower surface of the claw 43a, as shown in FIG. 10B.

(B) in the above cover structure, the operation of engageably securing the cover 5 to the base member 4 is simply to push the cover toward the window glass WG, and it is possible to implement one touch operation, as compared to the configuration of sliding the cover along the surface of the window glass, as disclosed in Patent Document 1 or 2. Also, at the state where the cover 5 is engageably secured to the base member 4, the engaged part 55 is urged in the receiving space 46 in the direction of maintaining the engaged state, i.e., in the direction in which the engagement is difficult to be released by a part of the urging force accumulated in the elastic piece 48, as shown in FIG. 12B. For this reason, in the above structure, even when the unintentional external force is applied to the engageably secured part, the engagement is not easily released, so that it is possible to improve the mounting operability and the stable holding ability.

(C) In a main operation that is performed when demounting the cover 5 due to the maintenance or the like, when the cover 5 is slightly (about 2 mm, in this example) slid in an arrow direction of FIG. 13A, i.e., in a rearward direction, the elastic piece 48 is elastically displaced outward and the engaging step 55a is disengaged from the claw 47a, at the main part 50. At the same time, at the extension part 51, as the claw 43a is pressed by the pressing projection 57b, the swinging piece 43 is elastically displaced inward, so that the engaging projection 57a is disengaged from the claw 43a. From this state, the cover 5 is demounted by rotating or pulling the same in an arrow direction of FIG. 13B, i.e., from the window glass WG toward the inside of the vehicle interior. In other words, in the above structure, since the engagement of the engaging step 55a to the claw 47a and the engagement of the engaging projection 57a to the claw 43a can be released by sliding the cover 5 against the urging direction of the elastic piece 48, the disengaging operation can also be easily performed when demounting the cover 5.

(Third Aspect)

A third aspect is different from the first aspect, in that the electronic device such as the camera (not shown) is fixed to the window glass WG by the double-sided adhesive tape or the like, and is also different from the second aspect, in that a cover 7 has an extension part 71 but a base member 6 is not provided with the harness holding part.

That is, in FIGS. 14 to 17B, the cover 7 has an extension part 71 integrally protruding from a rear end. The cover 7 is engageably secured to the base member 6 by a mutual engaging means capable of mutually engaging with each other. This mutual engaging means includes an engaging part 65 provided to one of the base member 6 and the cover 7, an engaged part 75 provided to the other and configured to engage with the engaging part 65, and an elastic piece 68, which is an urging means provided to one of the engaging part 65 and the engaged part 75 and urging the engaged part 75 in a direction of engaging with the engaging part 65. When the cover 7 is pushed toward the window glass WG of the vehicle, the engaged part 75 engages with the engaging part 65 with being urged in a direction following the surface of the window glass by the elastic piece 68. The engagement can be released by moving the cover 7 against the urging of the elastic piece 68. In the below, the configurations are described in detail.

Figure 15:
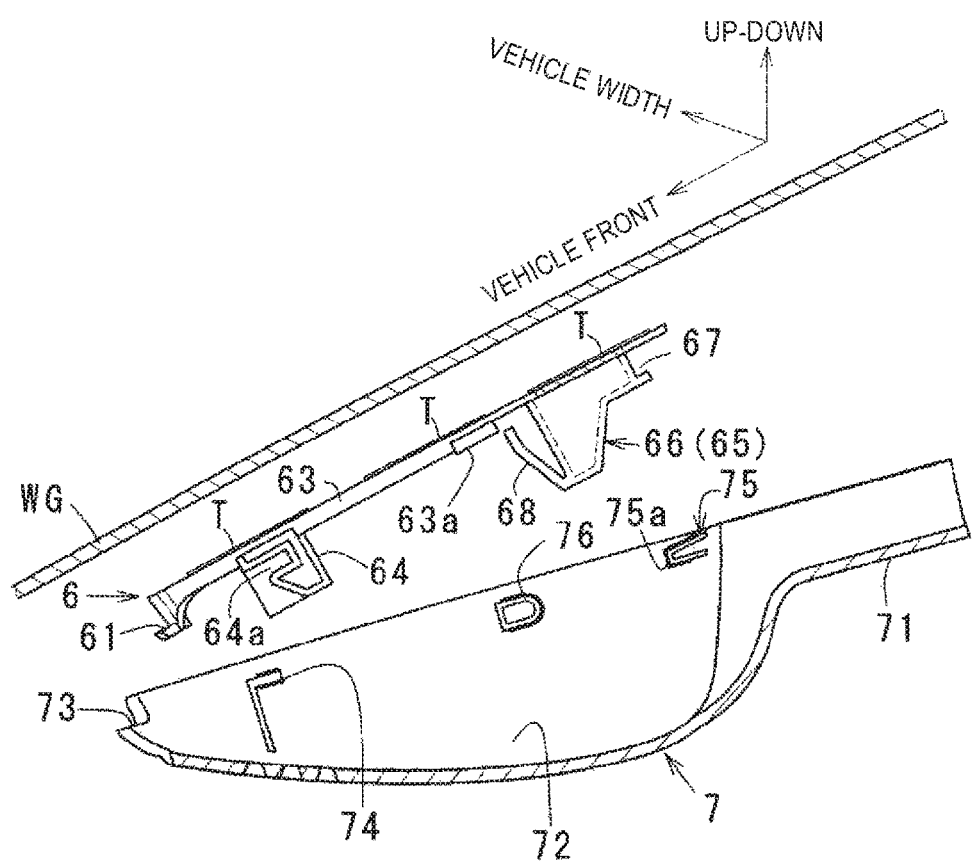
FIG. 15 is a pictorial view depicting a relation of the base member and the cover with respect to the window glass.

First, the base member 6 has a substantially rectangular frame shape defined by front and rear side parts 61, 62 and both side parts 63, is configured to escape the electronic device by a hole portion 60 in the frame, has a flat lower surface, and is fixed to a predetermined position of the window glass WG, which is the installation part, by the double-sided adhesive tape T, the adhesive or the like, as shown in FIG. 15.

Both the side parts 63 are provided with front blocks 64, 64 having a substantially rectangular shape and facing each other in the right and left direction at the front side, rear blocks 66, 66 facing each other in the right and left direction at the rear side, and guide parts 63a having a convex shape and provided in front of the rear blocks 66. An outer surface of each front block 64 is provided with an engaging receiving portion 64a having a lateral recess shape and an opened front side. An upper surface of each guide part 63a is formed as a flat slide surface. Each rear block 66 is provided with an engaging part 65 of the present invention. The engaging part 65 has a concave portion 67 for engaging positioned at a block rear end-side, defined between the rear block and the rear side part 62 and opening rearward, and an elastic piece 68 positioned at a block front end-side and provided with an interval from a block upper side.

Figure 14:
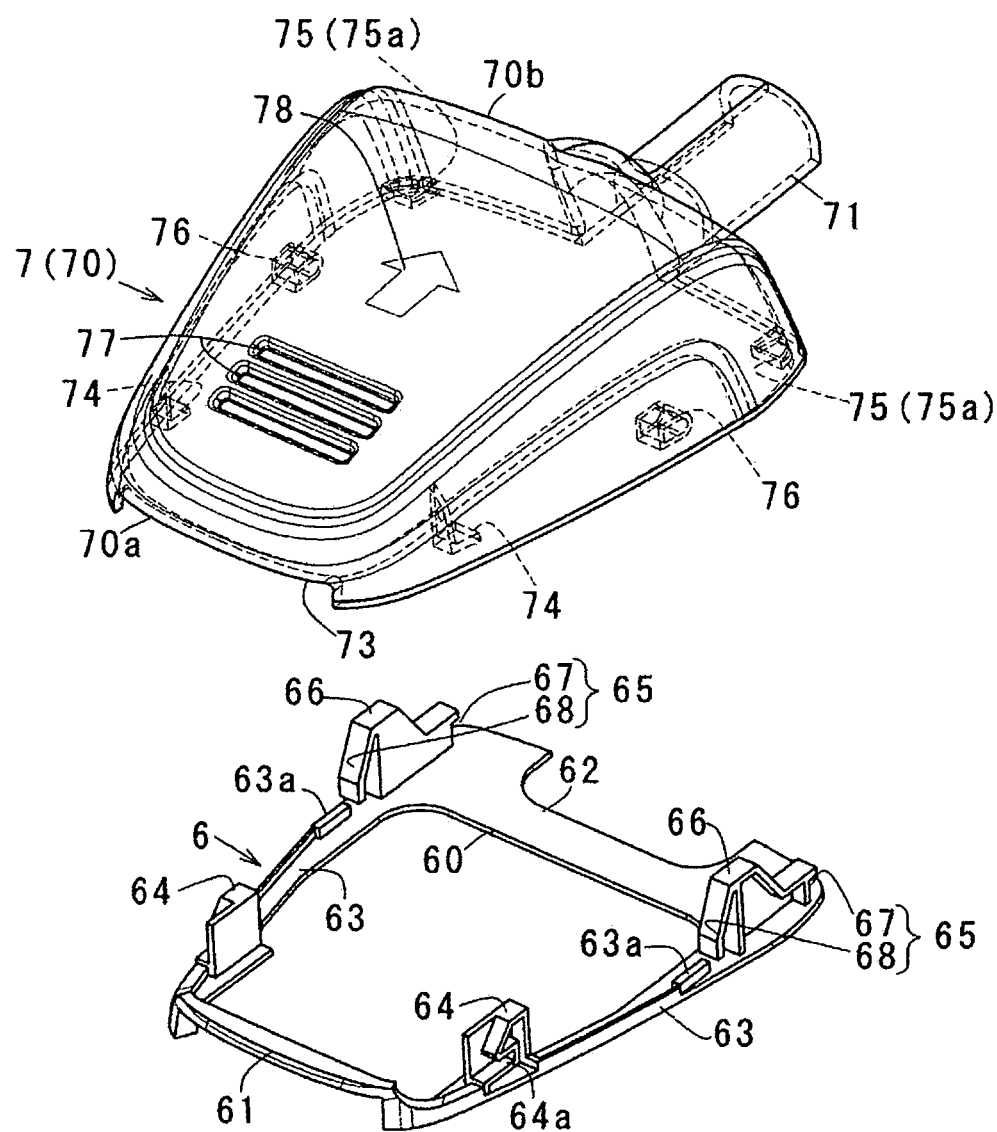
FIG. 14 is an exploded perspective view of a cover and a base member, depicting a third aspect of the present invention.

In the meantime, the cover 7 has a main part 70 having a size capable of covering the electronic device to be fixed to the window glass WG, and a gutter-shaped extension part 71. The extension part 71 is a part configured to cover the wire harness connected to the electronic device, for example. The main part 70 has a front end 70a having a width size slightly smaller than a rear end 70b, and a step portion 73 formed by notching an edge portion. As shown in FIGS. 14 and 15, an internal part 72 is provided with a pair of engaging pieces 74 capable of engaging with the respective engaging receiving portions 64a, and parts to be engaged 75 capable of engaging with the engaging parts 65. Each engaging piece 74 has a reversed L shape, and a tip end of a horizontal portion of the L shape is configured to slidably engage with the engaging receiving portion 64a. The engaged part 75 has a pair of engaging projections 75a configured to engage with the respective concave portions 67, and a pair of abutting portions 76 capable of contacting the respective elastic pieces 68. A reference numeral 77 indicates a plurality of lateral recesses provided to the main part 70. A reference numeral 78 is an indication mark of a release direction in which the cover 7 is to be moved when demounting the cover 7 from the base member 6. The indication mark 78 may be omitted. On the other hand, the indication mark may be added to the cover 3 of the first aspect or the cover 5 of the second aspect, as required.

Figure 16A:
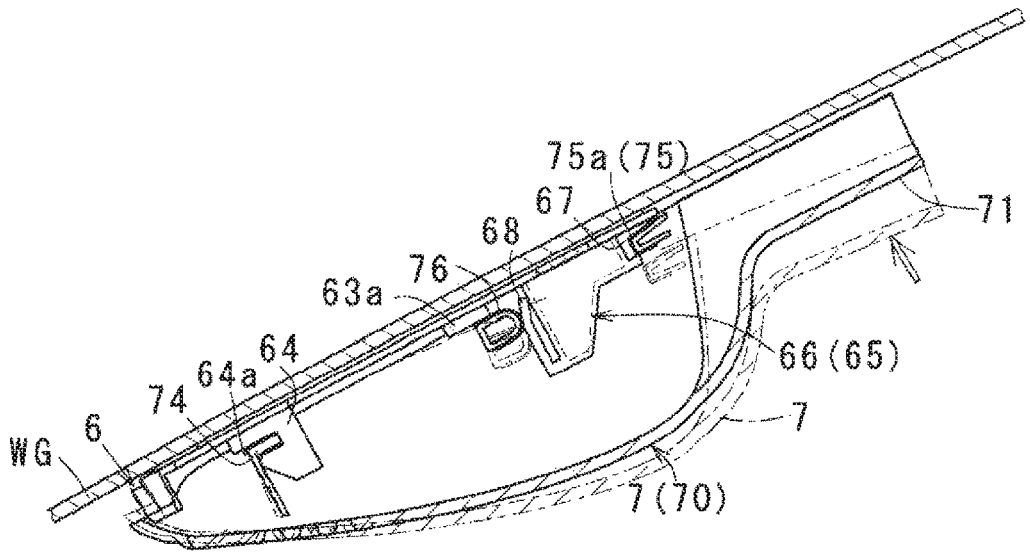
Figure 16B:
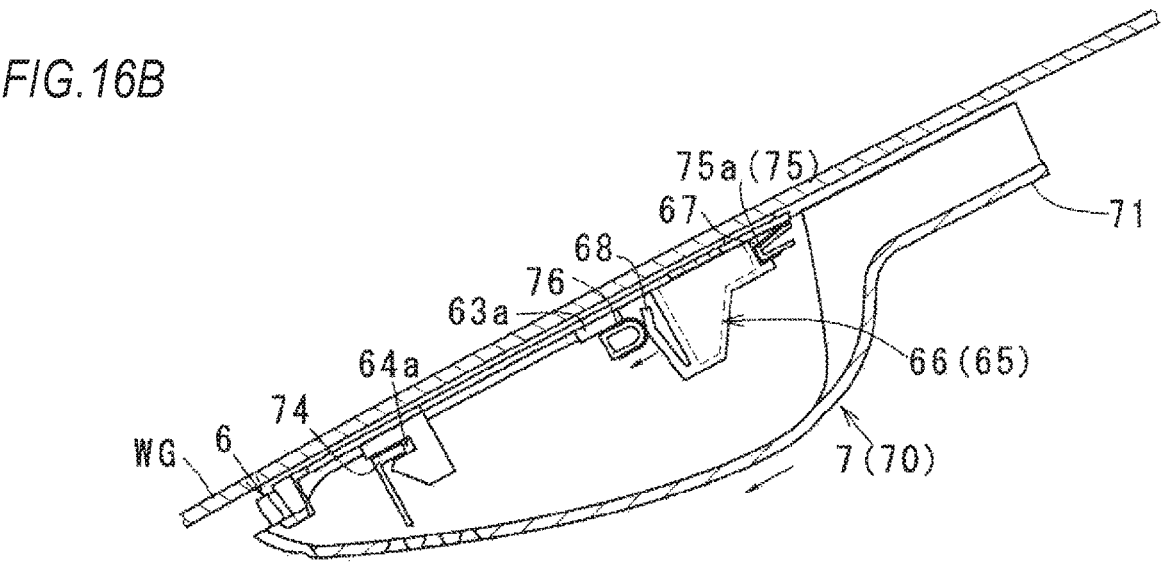
Figure 17A:
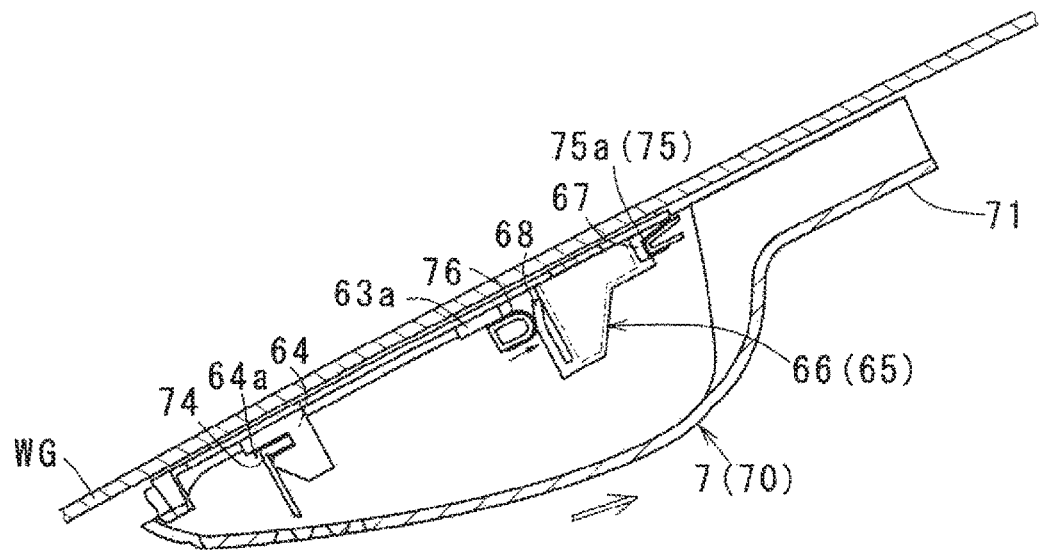
Figure 17B:
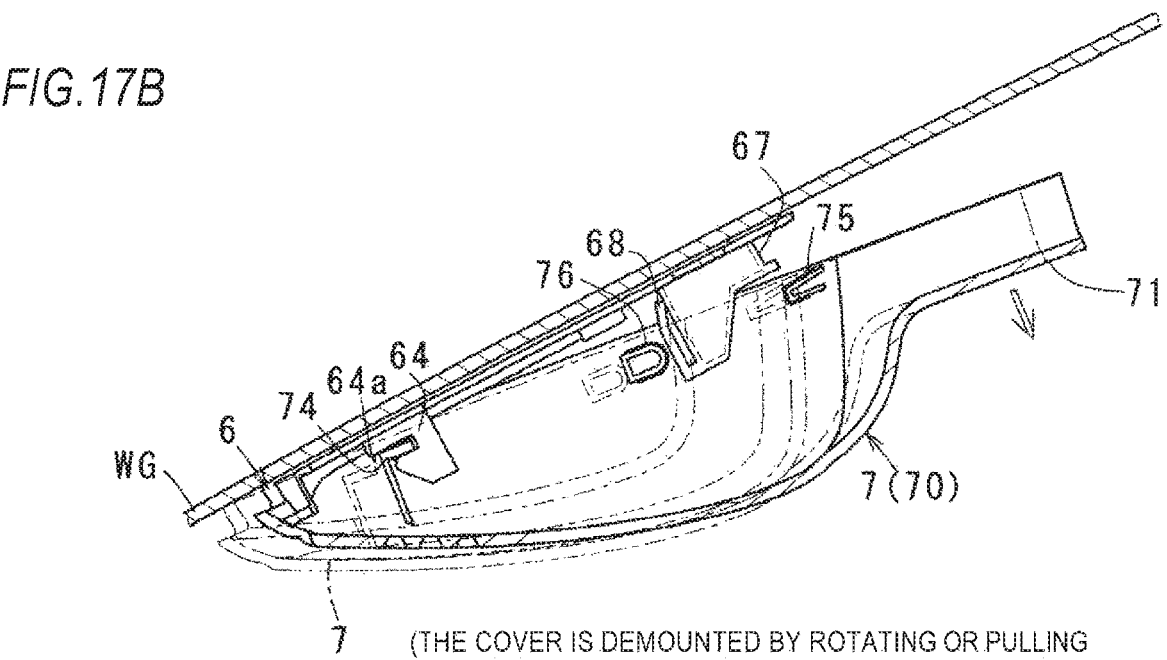
Figure 18A:
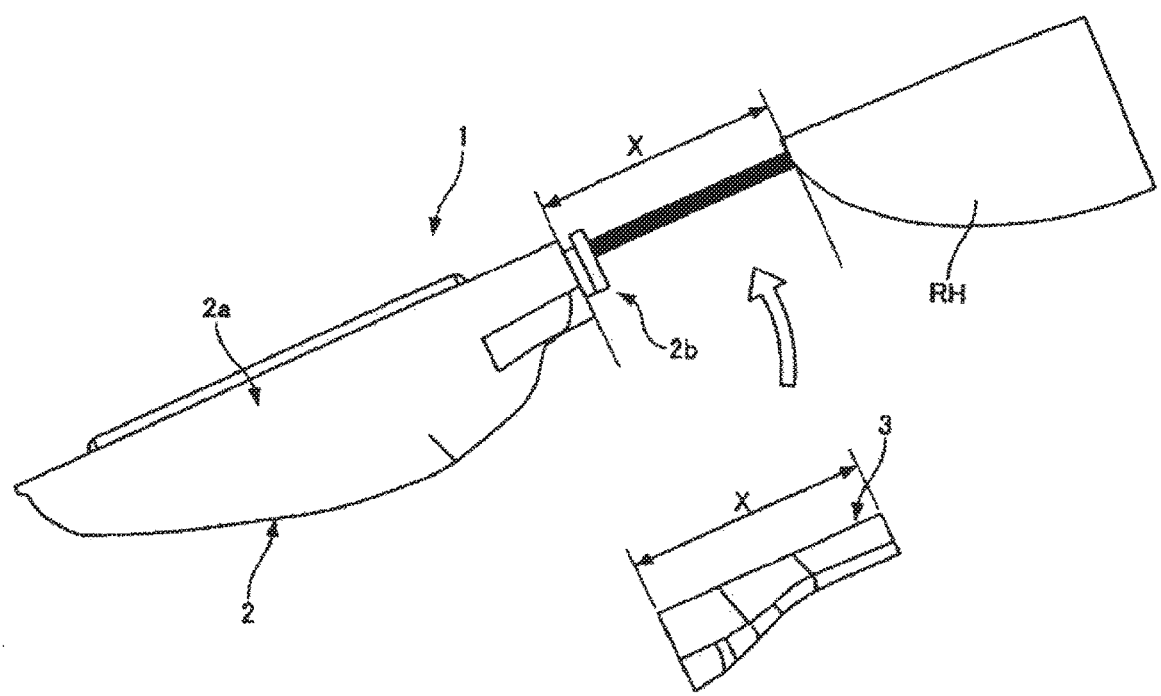
FIG. 18A is FIG. 1 of Patent Document 1.
Figure 18B:
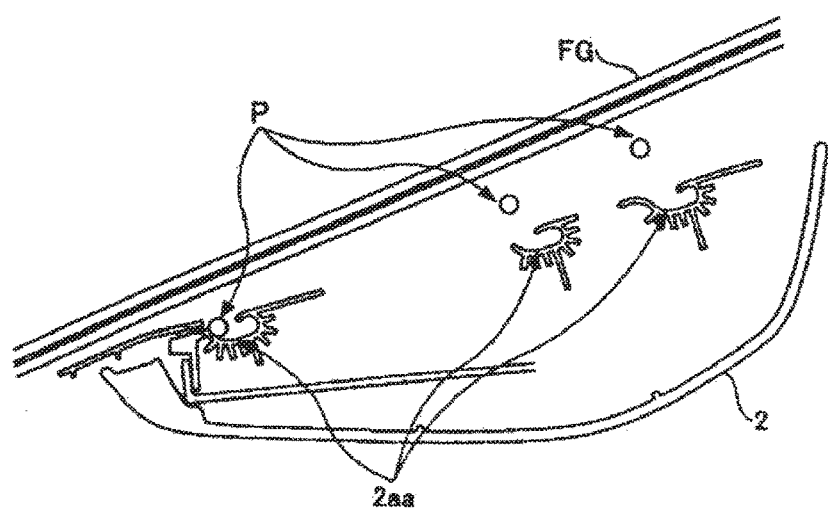
FIG. 18B is FIG. 4A of Patent Document 1.
Figure 19:
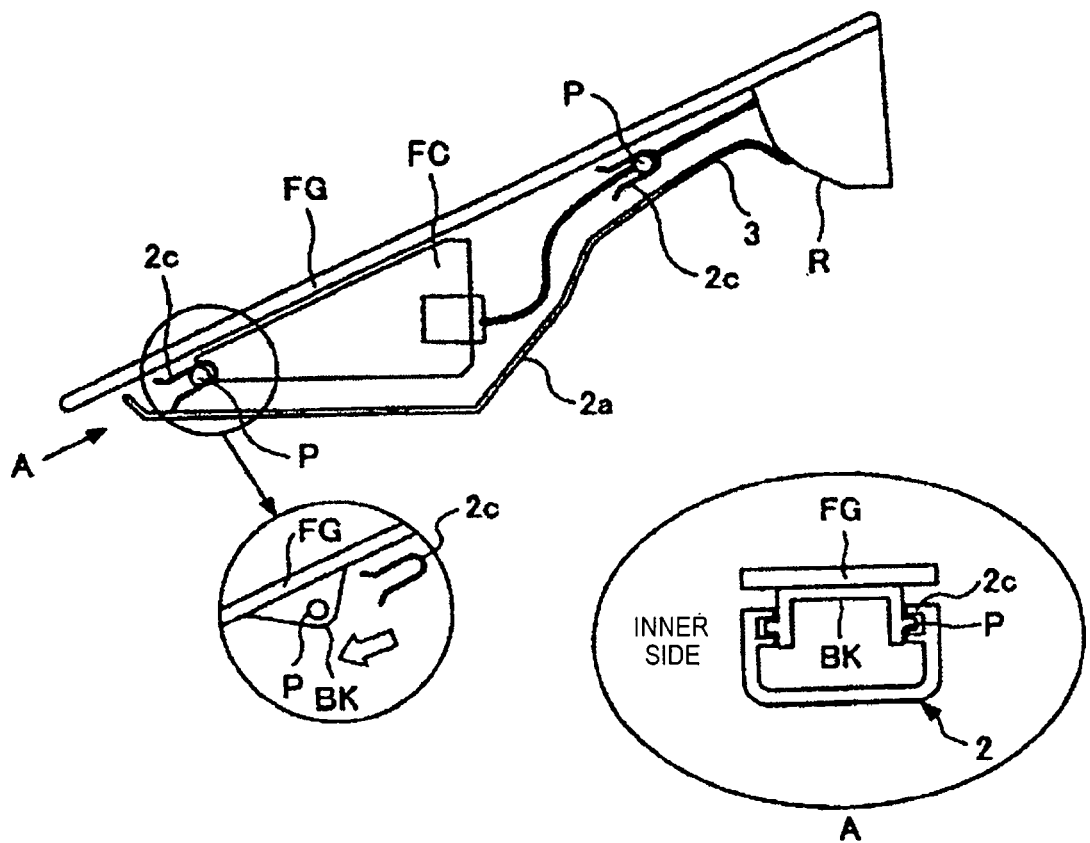
FIG. 19 is FIG. 3 of Patent Document 2.

The elastic piece 68 operates in the similar manner to the elastic piece 38 of the first aspect. That is, at a stage before the engaging projection 75*a* engages with the concave portion 67 of the engaging part, the elastic piece 68 is at an initial position at which it does not exhibit an urging force, as shown in FIG. 17B, and the elastic piece is elastically displaced by a reactive force applied from the abutting portion 76 and accumulates the maximum urging force while the engaging projection 75*a* is entering the concave portion 67, as shown in FIG. 16A. When the pressing state to the cover is released, as shown in FIG. 16B, the cover 7 is slightly moved by the urging force accumulated in the elastic piece 68 in the direction in which the engaging projection 75*a* engages with the concave portion 67. The elastic piece 68 urges the engaged part 65 in the direction of maintaining the engaged state.

(Operations)

FIG. 16 depicts an operation example, which is performed when fixing the base member 6 to the determined position of the window glass WG of the vehicle by the double-sided adhesive tape T or the like and then engageably securing the cover 7 to the base member. 6 from the attached state. FIG. 17 depicts an operation example, which is performed when demounting the cover 7 again due to the maintenance or the like.

(A) In a main operation that is performed when engageably securing the cover 7 to the base member 6, as shown with the dashed-dotted line in FIG. 16A, the cover 7 is arranged at a predetermined position with respect to the base member 6, i.e., the engaging piece 74 of the cover is fitted to the engaging receiving portion 64*a* of the base member. At this positioned state of the cover 7, the elastic piece 68 is pushed by the abutting portion 76 and is thus displaced in the direction of accumulating the urging force, and the cover is rotated or pushed toward the window glass WG. That is, the cover 7 is pressed toward the window glass WG, which is an arrow direction of FIG. 15A, by a hand or the like. Then, the engaged part 75 is in a state where the engaging projection 75*a* and the concave portion 67*a* can engage with each other. Thereafter, when the pressing hand is separated, the cover 7 is slightly (about 2 mm, in this example) moved in an arrow direction of FIG. 16B by a part of the urging force accumulated in the elastic piece 68. As a result, the engaging projection 75*a* is engaged with the concave portion 67*a* and the engaged state is maintained in the state urged by the elastic piece 68.

(B) In the above cover structure, the operation of engageably securing the cover 7 to the base member 6 is simply to push the cover toward the window glass WG, and it is possible to implement one touch operation, as compared to the configuration of sliding the cover along the surface of the window glass, as disclosed in Patent Document 1 or 2. Also, at the state where the cover 7 is engageably secured to the base member 6, the cover 7 is urged in the direction of maintaining the engaged state, i.e., in the direction in which the engagement is difficult to be released by a part of the urging force accumulated in the elastic piece 48, as shown in FIG. 16B. For this reason, in the above structure, even when the unintentional external force is applied to the engageably secured part, the engagement is not easily released, so that it is possible to improve the mounting operability and the stable holding ability.

(C) In a main operation that is performed when demounting the cover 7 due to the maintenance or the like, when the cover 7 is slightly (about 2 mm, in this example) slid in an arrow direction of FIG. 17S, i.e., in a rearward direction, the elastic piece 48 is pushed and elastically displaced by the abutting portion 76 to slide along the upper surface of the guide part 63*a*, and the engaging projection 75*a* is disengaged from the concave portion 67*a*. From this state, the cover 7 is demounted by rotating or pulling the same in an arrow direction of FIG. 17B, i.e., from the window glass WG toward the inside of the vehicle interior. In other words, in the above structure, since the engagement of the engaging projection 75*a* to the concave portion 67*a* can be released by sliding the cover 7 against the urging direction of the elastic piece 68, the disengaging operation can also be easily performed when demounting the cover 7.

(Fourth Aspect)

Figure 20:
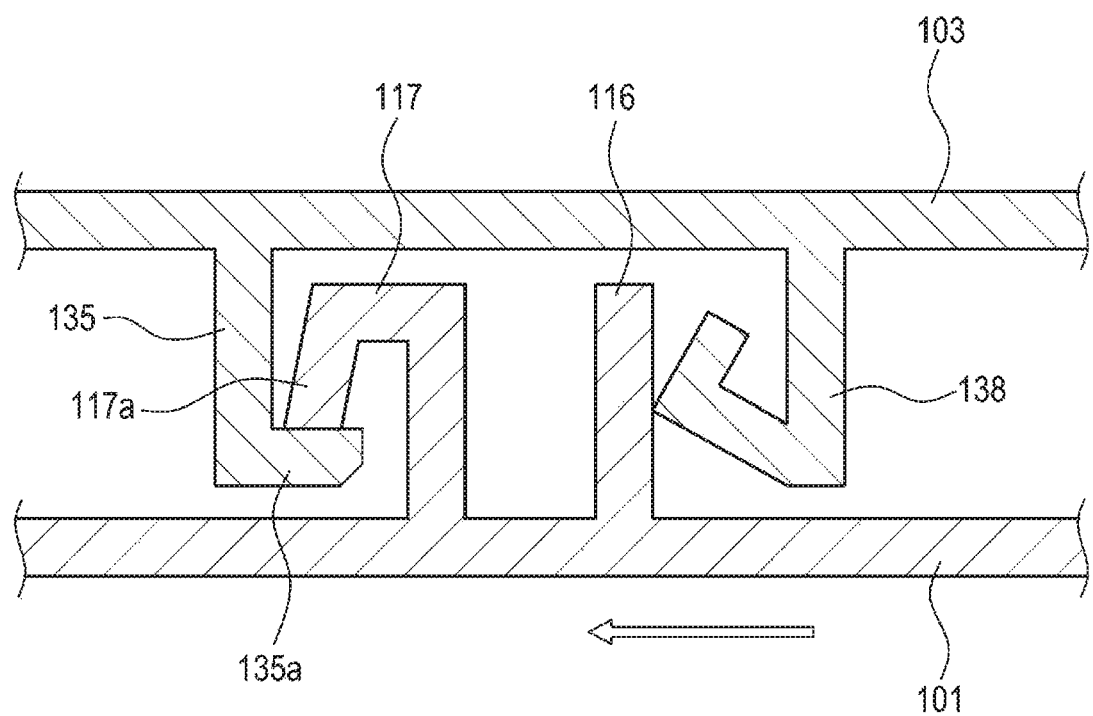
FIG. 20 is a sectional view of a cover and a base member, depicting a fourth aspect of the present invention.

A fourth aspect is different from the first aspect and the like, in that the elastic piece, which is the urging means, is not provided to any one of the engaging part and the engaged part but is provided to any one of the base member and the cover. Specifically, as shown in FIG. 20, a base member 101 has a pair of holding pieces 116, 117, as the engaging part. A tip end of one holding piece 117 has a substantial U shape, so that it is configured as a deviation preventing claw 117*a*. A tip end piece of the substantially U-shaped deviation preventing claw 117*a* is formed with an inclined surface for guide that is gradually enlarged toward the base member 101. A cover 103 has an engaged part 135 and an elastic piece 138. The engaged part 135 is provided with an engaging projection 135*a* that can engage with the deviation preventing claw 117*a*. A tip end face of the engaging projection 135*a* is notched to have an inclined surface corresponding to the inclined surface for guide of the deviation preventing claw 117*a*.

When the cover 103 is pushed toward the base member 101, the engaging projection 135*a* is contacted to the inclined surface of the deviation preventing claw 117*a* and is slid along the inclined surface. At this time, as shown in FIG. 20, the elastic piece 138 is contacted to one holding piece 116, so that the pair of holding pieces 116, 117 is applied with the urging force in an arrow direction of FIG. 20. Thereby, the pair of holding pieces 116, 117 is moved in the arrow direction of FIG. 20, so that the engaging projection 135*a* engages with the claw 117*a*, and the engaged state is maintained in the state urged by the elastic piece 138. Like this, according to the structure of the fourth aspect, it is possible to provide the cover structure capable of easily performing the mounting and demounting operations, and stably maintaining the engaged state and having no concerns that that a friction sound will be caused in the engaging part, even when the vibrations are applied.

The present invention can be appropriately changed except for the requirements defined in the claims. For example, the engaging receiving portion 13, 42*a*, 64*a* and the engaging piece 33, 53, 74 are not limited with respect to the shapes thereof inasmuch as the cover is rotatably supported to the base member. Also, the engaging piece may be provided to the base member, and the engaging receiving portion may be provided to the cover.

The subject application is based on a Japanese Patent Application No. 2015-104239 filed on May 22, 2015, the contents of which are incorporated herein by reference.

What is claimed is:

1. An onboard electronic device cover configured to be engageably secured to a base member, which is to be fixed to a window glass of a vehicle, to cover an electronic device which is to be held on an installation part which is one of the base member and the window glass, the onboard electronic device cover comprising:
a mutual engaging mechanism capable of mutually engaging the onboard electronic device cover with the base member,
wherein the mutual engaging mechanism includes:
an engaging part provided to one of the base member and the cover;
an engaged part provided to the other of the base member and the cover and capable of engaging with the engaging part; and
an urging member configured to urge the engaging part toward the engaged part, and
wherein when the cover is pushed toward the window glass, the engaging part engages with the engaged part with being urged in a direction following a surface of the window glass by the urging member.

2. The onboard electronic device cover according to claim 1, wherein the urging member is provided to one of the base member and the cover.

3. The onboard electronic device cover according to claim 1, wherein the urging member is provided to one of the engaging part and the engaged part.

4. The onboard electronic device cover according to claim 1, wherein the urging member comprises a bending-deformable elastic piece, and engagement between the engaging part and the engaged part can be released by moving the cover against an urging direction of the elastic piece.

5. An onboard electronic device cover configured to be engageably secured to a base member, which is to be fixed to a window glass of a vehicle, to cover an electronic device which is to be held on an installation part which is one of the base member and the window glass, the onboard electronic device cover comprising:
a mutual engaging mechanism capable of mutually engaging the onboard electronic device cover with the base member,
wherein the mutual engaging mechanism includes:
an engaging part provided to one of the base member and the cover;
an engaged part provided to the other of the base member and the cover and capable of engaging with the engaging part; and
an urging member configured to urge the engaging part toward the engaged part, the urging member comprising a bending-deformable elastic piece, and engagement between the engaging part and the engaged part being released by moving the cover against an urging direction of the elastic piece,
wherein the engaging part includes a pair of holding pieces having a receiving space formed therebetween, and a deviation preventing claw provided to one holding piece and protruding into the receiving space, and the engaged part comprises an engaging projection capable of engaging with the deviation preventing claw, and the elastic piece, and
wherein when the cover is pushed toward the window glass of the vehicle, the engaged part enters the receiving space in association with displacement of the elastic piece in the urging direction, and the engaging part engages with the engaged part with being urged in a direction following a surface of the window glass by the urging member and the engaging projection can engage with the deviation preventing claw.

6. The onboard electronic device cover according to claim 4, wherein
the engaging part includes a pair of holding pieces having a receiving space formed therebetween, and a deviation preventing claw which is provided to one of the holding pieces and protrudes into the receiving space, the other of the holding pieces is formed as the elastic piece, and the engaged part includes an engaging projection configured to engage with the deviation preventing claw, and
when the cover is pushed toward the window glass of the vehicle, the engaged part enters the receiving space in association with displacement of the elastic piece in the urging direction, and the engaging projection can engage with the deviation preventing claw.

7. The onboard electronic device cover according to claim 4, wherein
the engaging part includes a concave portion opening toward an upper side of the window glass, and the elastic piece, and the engaged part comprises an engaging projection configured to engage with the concave portion, and an abutting portion configured to contact the elastic piece, and
when the cover is pushed toward the window glass of the vehicle, the engaging projection can engage with the concave portion in association with displacement of the elastic piece in the urging direction via the abutting portion.

8. An onboard electronic device cover configured to be engageably secured to a base member, which is to be fixed to a window glass of a vehicle, to cover an electronic device which is to be held on an installation part which is one of the base member and the window glass, the onboard electronic device cover comprising:
a mutual engaging mechanism capable of mutually engaging the onboard electronic device cover with the base member,
wherein the mutual engaging mechanism includes:
an engaging part provided to one of the base member and the cover;
an engaged part provided to the other of the base member and the cover and capable of engaging with the engaging part; and
an urging member configured to urge the engaging part toward the engaged part,
an engaging piece provided at a tip end portion of one of the base member and the cover in a front and back direction of the vehicle, and
an engaging receiving portion provided at a tip end portion of the other of the base member and the cover in the front and back direction of the vehicle,
wherein when the cover is pushed toward the window glass, the engaging part engages with the engaged part with being urged in a direction following a surface of the window glass by the urging member, and
wherein when the cover is rotated toward the window glass by using the engaging piece as a shaft at a state where the engaging piece engages with the engaging receiving portion, the engaging part and the engaged part engage with each other.

* * * * *